United States Patent
Hartung et al.

(10) Patent No.: US 9,915,950 B2
(45) Date of Patent: Mar. 13, 2018

(54) AUTONOMOUS VEHICLE INTERFACE SYSTEM

(71) Applicant: Polysync Technologies, Inc, Portland, OR (US)

(72) Inventors: Joshua John Hartung, Portland, OR (US); Jonathan Lamb, Portland, OR (US); David Paul Miller, Portland, OR (US); Robert Dean Hambrick, Mackinaw, IL (US)

(73) Assignee: PolySync Technologies, Inc., Portland, OR (US)

( * ) Notice: Subject to any disclaimer, the term of this patent is extended or adjusted under 35 U.S.C. 154(b) by 231 days.

(21) Appl. No.: 14/588,313

(22) Filed: Dec. 31, 2014

(65) Prior Publication Data

US 2015/0331422 A1 Nov. 19, 2015

Related U.S. Application Data

(60) Provisional application No. 61/992,140, filed on May 12, 2014, provisional application No. 61/922,116, filed on Dec. 31, 2013.

(51) Int. Cl.
*G05D 1/02* (2006.01)
*G06F 3/01* (2006.01)

(52) U.S. Cl.
CPC ............... *G05D 1/021* (2013.01); *G05D 1/02* (2013.01); *G05D 1/0231* (2013.01); *G06F 3/01* (2013.01)

(58) Field of Classification Search
None
See application file for complete search history.

(56) References Cited

U.S. PATENT DOCUMENTS

| 6,058,307 | A | * | 5/2000 | Garner | H04B 7/18539 455/12.1 |
|---|---|---|---|---|---|
| 8,600,602 | B1 | * | 12/2013 | McAndrew | G05D 1/0038 244/76 R |
| 9,195,233 | B2 | | 11/2015 | Perrone | |
| 2005/0197766 | A1 | * | 9/2005 | Flann | A01B 79/005 701/533 |
| 2007/0208442 | A1 | * | 9/2007 | Perrone | G05D 1/0088 700/95 |
| 2010/0063673 | A1 | * | 3/2010 | Anderson | G05D 1/0287 701/29.2 |
| 2010/0141426 | A1 | * | 6/2010 | Zajac | G01D 21/02 340/539.1 |

(Continued)

*Primary Examiner* — Todd Melton
*Assistant Examiner* — Jason R Roberson
(74) *Attorney, Agent, or Firm* — Klarquist Sparkman, LLP

(57) ABSTRACT

In embodiments of an autonomous vehicle interface system, system nodes are each implemented as a distributed node for independent data processing of low-level sensor data and/or high-level system data. The high-level system data is abstracted from the low-level sensor data, providing invariance to system configuration in higher-level processing algorithms. The autonomous vehicle interface system includes at least one real-time bus for data communications of the low-level sensor data and the high-level system data between the system nodes. The system also includes an application programming interface (API) configured for access by the system nodes to the low-level sensor data and the high-level system data that is published on the real-time bus and accessible via the API.

25 Claims, 15 Drawing Sheets

(56) References Cited

U.S. PATENT DOCUMENTS

| | | | |
|---|---|---|---|
| 2010/0303068 A1* | 12/2010 | Glaros | H04L 12/4633 370/389 |
| 2014/0032012 A1* | 1/2014 | Joshi | G01S 13/865 701/1 |
| 2014/0350722 A1* | 11/2014 | Skrinde | B08B 9/049 700/245 |

* cited by examiner

AUTONOMOUS VEHICLE INTERFACE SYSTEM

RELATED APPLICATIONS

This application claims priority to U.S. Provisional Patent Application Ser. No. 61/922,116 filed Dec. 31, 2013 entitled "Modular Data Architecture for Autonomous Vehicles", the disclosure of which is incorporated by reference herein in its entirety. This application also claims priority to U.S. Provisional Patent Application Ser. No. 61/992,140 filed May 12, 2014 entitled "Autonomous Vehicle Interface System", the disclosure of which is incorporated by reference herein in its entirety.

BACKGROUND

Autonomous vehicles are developed to navigate and operate either unmanned or to assist a vehicle operator, and can utilize many different types of sensors, automation, robotics, and other computer-controlled systems and mechanisms. Inherently, autonomous vehicles are also developed with many active safety systems, which can not only increase driver comfort and reduce fatigue, but also reduce and/or eliminate vehicle injuries and deaths resulting from motor vehicle accidents. However, the many automated systems, sensors, and algorithms developed for use in an autonomous vehicle are costly and require considerable expertise to implement. Further, automobile companies and other vehicle manufacturers must each develop their own team of core competencies, technology infrastructure, and proprietary systems, which can be difficult and is cost prohibitive to include in mainstream consumer vehicles. To remain competitive in the marketplace, the companies and manufacturers that are unable to develop the internal competencies will need to partner with third parties that provide the autonomous vehicles systems. Likely, this will significantly decrease time to market for new vehicles but will tie a company to a third party proprietary system, which may be undesirable.

FIG. 1 illustrates an example of a conventional autonomous vehicle system 100, to include features of active safety systems. Generally, the autonomous vehicle system is representative of systems that include a centralized logging and data processing computer that receives sensor data input from a multitude of different sensors and components. Typically, these centralized systems have limited feature sets, as well as a lack of platform, sensor, and interface compatibility. Further, these centralized systems are susceptible to failure and can unexpectedly shut-down, such as due to cascading errors that cause the system to lockup, resulting in operation failure and potential loss of the autonomy platform. For example, an obstruction in the pathway of a vehicle may cause an unexpected failure of the simultaneous localization and mapping (SLAM) algorithm at 102, causing the fusion calculations of the ego motion to no longer converge at 104. Data flow through the ego motion (e.g., data received and communicated) can become blocked or stalled, resulting in a failure of the path planner at 106, and rendering the autonomous vehicle system inoperable and/or the vehicle immobile.

SUMMARY

This Summary introduces features and concepts of an autonomous vehicle interface system, which is further described below in the Detailed Description and/or shown in the Figures. This Summary should not be considered to describe essential features of the claimed subject matter, nor used to determine or limit the scope of the claimed subject matter.

An autonomous vehicle interface system is described. In embodiments, system nodes are each implemented as hosts in a distributed fashion for independent data processing of low-level sensor data and/or high-level system data. The high-level system data is abstracted from the low-level sensor data, providing invariance to system configuration in higher-level processing algorithms. The autonomous vehicle interface system includes at least one real-time bus for data communications of the low-level sensor data and the high-level system data between the system nodes. The system also includes an application programming interface (API) configured for access by the system nodes to the low-level sensor data and the high-level system data that is published on the real-time bus and accessible via the API.

In other embodiments of an autonomous vehicle interface system, a system node receives low-level sensor data from one or more sensors that detect targets in an environment surrounding an autonomous vehicle, and abstracts the low-level sensor data to generate high-level system data. The system node publishes the low-level sensor data and the high-level system data on a real-time bus that is implemented for data communications between system nodes of an autonomous vehicle interface system, the system nodes each distributed for independent data processing of at least one of the low-level sensor data and the high-level system data. The system node accesses the low-level sensor data and the high-level system data that is published on the real-time bus via an application programming interface (API) configured for access by the system nodes.

BRIEF DESCRIPTION OF THE DRAWINGS

Embodiments of an autonomous vehicle interface system are described with reference to the following Figures. The same numbers may be used throughout to reference like features and components that are shown in the Figures.

DETAILED DESCRIPTION

Embodiments of an autonomous vehicle interface system are described. Autonomous vehicle systems, to include the many features of active safety systems, can be implemented as a distributed sensor system architecture that abstracts low-level sensor detection and processing to a high-level application programming interface (API), which enables standard implementation by many different vehicle manufacturers, ease of updates and maintenance, and future compatibility. The distributed sensor system architecture is modular, having multiple sensor processing nodes, and includes a real-time data bus for data communication between the sensor processing nodes. This distributed architecture provides that a system sensor node or processing node can be exchanged, bypassed, or reconfigured for a wide variety of applications, while abstracting the low-level data handling to a higher-level API that then interfaces with a vehicle manufacturer's proprietary system.

While features and concepts of an autonomous vehicle interface system can be implemented in any number of different devices, systems, networks, environments, architectures, and/or configurations, as well as for any distributed sensing and control system, embodiments of an autonomous vehicle interface system are described in the context of the following example devices, systems, and methods.

Figure 2:
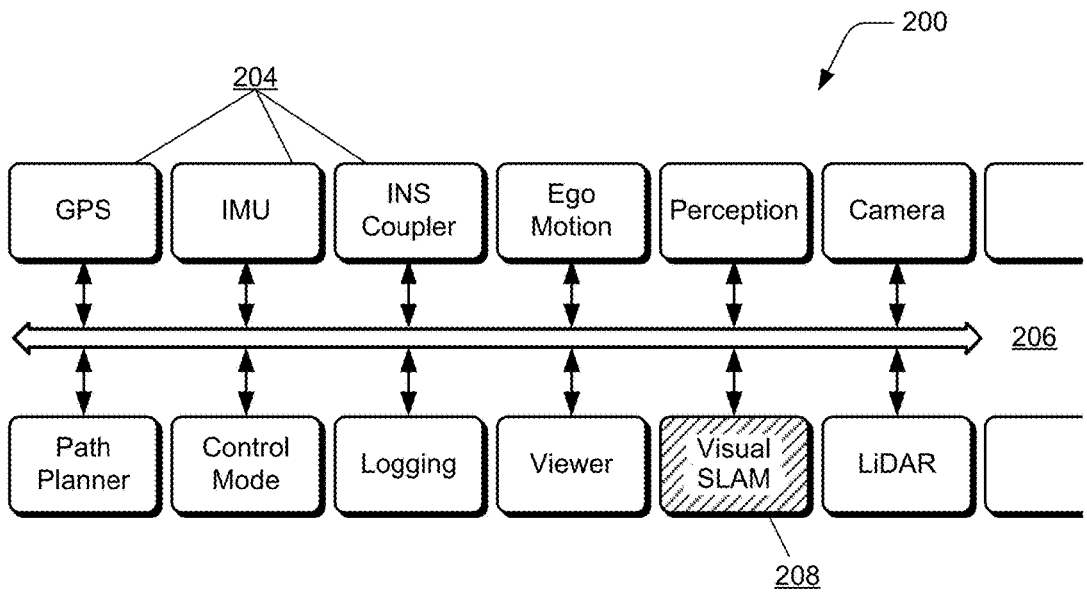
FIG. 2 illustrates an example of a system architecture that implements an autonomous vehicle interface system in accordance with one or more embodiments.

FIG. 2 illustrates an example system architecture 200 that can be utilized to implement embodiments of an autonomous vehicle interface system, as described herein. In embodiments, the system architecture 200 can be implemented as a publisher-subscriber architecture, in which all applications publish and subscribe to topics that are available to every application (e.g., software applications) on the bus. Additionally, the system architecture 200 can be implemented as a hybrid model that includes the publisher-subscriber architecture, as well as a get-set framework that provides the applications the ability to call for certain parameters and receive them. For example, an application can be queried for its health status or current operating state, and a query response is received back. In addition, an operating state of the application can also be set. The system architecture 200 implements the strengths of the communication modes of both a publisher-subscriber architecture and a get-set framework. For example, some data in the autonomous vehicle interface system needs to be sent out as high bandwidth via the publisher-subscriber architecture, such as image data from a camera that is continually streamed. Alternatively, status information may only need to be communicated periodically, such as to indicate a status change or when requested. The get-set framework can be used to analyze and adjust the operational health of the various system nodes, and in the context of reliability and safety, the get-set framework is used to check system node status with settable trouble codes.

In this example, the system architecture 200 incorporates multi-sensor parsing for a multitude of different types of sensors 204, such as vision, radar, LiDAR, IMU, GPS, camera, and any other types of sensors that may be utilized in an autonomous vehicle system. In embodiments, each of the sensors 204 is representative of a sensor or an individual host system that can include computer and/or sensor hardware, as well as the related software and applications implemented for each host that participates (e.g., as a publisher and/or a subscriber) in the PolySync system on the PolySync bus 206. The system architecture 200 implements synchronization, motion correction, fusion, visualization, logging, and any other types of sensor and data processing.

The system architecture 200 also provides multi-platform support (e.g., Windows™, Linux™, etc.), as well as multi-interface support (e.g., CAN interfaces, TCP/IP, UDP, serial, USB, etc.). The system architecture 200 implements plug-and-play sensors, and a standardized API with abstracted data, such as to swap and/or upgrade sensors as-needed. The system architecture implements feature-rich visualization and a control GUI, as well as provides low-level data fusion, sophisticated filtering, and motion compensation in a fast, efficient, scalable, and embeddable data framework that can be maintained by a single, dedicated support team.

The system architecture 200 implements the autonomous vehicle interface system with features collectively referred to herein as PolySync and PolySync Viewer. PolySync can be provided as off-the-shelf middleware for autonomous systems with an easy-to-use API that abstracts low-level system data to high-level data structures. This results in better stability, maintainability, and faster time to market for autonomous vehicle systems than independently developed systems.

PolySync Viewer is a feature set that provides logging and playback, 3D data visualization, system monitoring, configuration, and management for an autonomous vehicle interface system. In embodiments, the architecture 200 of the autonomous vehicle interface system can be implemented to utilize a transport protocol such as data distribution service (DDS), which is an open source standard from the Object Management Group (OMG) with a real-time data bus. This architecture minimizes inter-process dependencies to provide a reliable, fault-tolerant, high-bandwidth middleware that is ready for everything from experimental work to mass deployment. DDS provides the system data architecture for the distributed system nodes on the real-time bus. Utilizing the DDS architecture and implementation of the API on top of that architecture is unique, particularly in the automotive and vehicle production industry.

The system architecture 200 that implements PolySync provides multiple layers of reliability, and the system is distributed so that individual nodes can fail without affecting the integrity of the data bus and overall system. For example, an obstruction in the pathway of a vehicle may cause an unexpected failure of the simultaneous localization and mapping (SLAM) algorithm at 208. However, the failure at the one node does not affect the data communications and messaging between the other nodes of the autonomous vehicle interface system.

Figure 3:
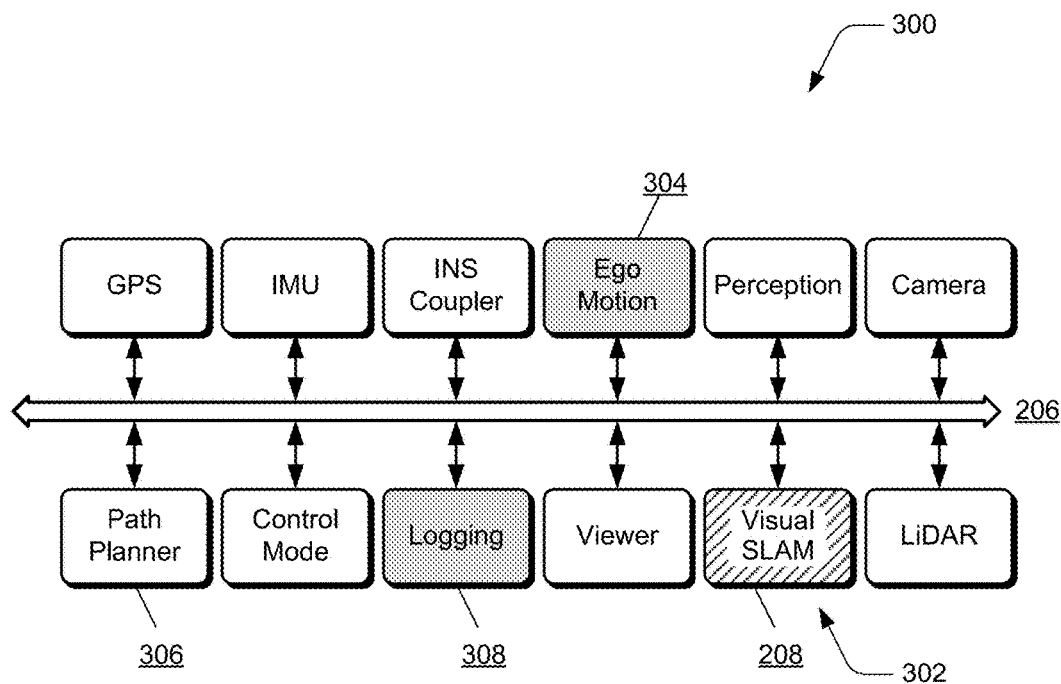
FIG. 3 further illustrates an example of the system architecture that implements an autonomous vehicle interface system in accordance with one or more embodiments.

FIG. 3 further illustrates an example 300 of the system architecture 200 that implements embodiments of an autonomous vehicle interface system, as shown and described with reference to FIG. 2. This example 300 illustrates that PolySync provides a sophisticated inter-process diagnostic subsystem to monitor errors and change node states to mitigate failures, such as cascading failures that may still occur due to data dependency. A state machine for a fault management and diagnostics system is shown and further described with reference to FIG. 10. Continuing the example of the obstruction in the pathway of the vehicle that causes an unexpected failure of the SLAM algorithm 208 (as shown at 302), the ego motion receives a diagnostic message informing of the SLAM error or failure at 304, and the ego motion changes state to ignore any subsequent SLAM data. The path planner operation is then unaffected at 306 by the SLAM error or failure, and the system errors, such as the SLAM error, are recorded in a "black box" diagnostic logger for later analysis at 308. The sophisticated inter-process diagnostic subsystem to monitor errors and change node states to mitigate failures is further described with reference to the fault management and diagnostics system shown in FIG. 10, as well as generally described herein.

In other examples, an autonomous vehicle may be sent out on a safety critical mission, such as for a military application or an emergency response, and a communication line is cut when the vehicle is attacked or damaged, runs into a tree or rubble, etc. The autonomous vehicle interface system includes the feature of automatic instantaneous multi-pathing to re-route any communications through backup lines. Alternatively, a computer at one of the system architecture nodes (e.g., a sensor node, data processing node, logging node, etc.) may fail. Every computer device on the network and in the architecture system has a complete copy of the system, lying dormant. The system includes an algorithm that will automatically re-distribute the system processing nodes onto the available remaining computers without a central manager, which would itself be a single point of failure. A manager-node architecture illustrates the details of the system architecture, and is shown and further described with reference to FIG. 5. Alternatively or in addition, a central manager may be implemented to perform some or all of the multi-pathing, processing failure recovery, and any of the other described features related to PolySync and PolySync Viewer. In the event that a processing node is no-longer seen or recognized on the bus, the system stops and automatically activates the dormant nodes that are needed. It also redistributes the processing nodes in order to achieve the most balanced load on all available computers.

The overall system architecture 200 that implements embodiments of the autonomous vehicle interface system creates system redundancy without having fully redundant hardware, generally referred to herein as adaptive redundancy. In an example, for redundancy of a conventional autonomy system, or generally any network system that includes two individual computer devices, a computer failure would typically require having to deactivate the entire system (both computer devices) and activate different computers of a backup system. In implementations of an autonomous vehicle interface system, the same backup effect can be implemented with three or even just two computer devices. In the event of a failure, the algorithm can re-assign the computing tasks (nodes) of the failed computer device onto the appropriate remaining computer devices. This is an example of a self-healing behavior, and although the system may run a bit slower due to an increased load, it keeps functioning and is operable. The same applies to sensor failures as well. If the system architecture includes backup or redundant sensors, they can be activated to replace a failed sensor. Alternatively or in addition, the diagnostic system allows the system architecture to determine whether it can still complete a mission despite the loss of a particular sensor or node.

Figure 4:
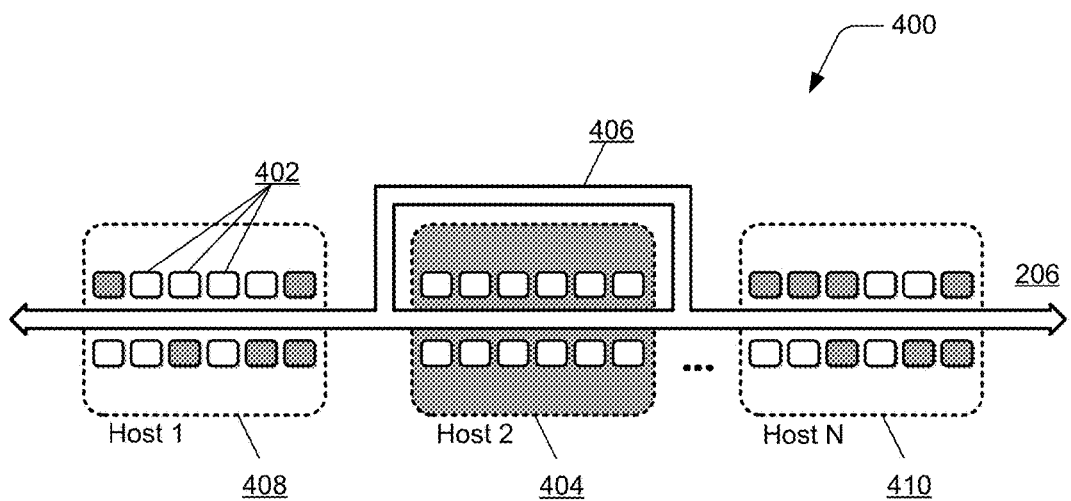
FIG. 4 illustrates an example of redundancy capabilities of the system architecture that implements an autonomous vehicle interface system in accordance with one or more embodiments.

FIG. 4 illustrates an example 400 of the redundancy capabilities of the system architecture 200 that implements embodiments of an autonomous vehicle interface system, as shown and described herein. In this example 400, a diagnostic subsystem provides software and hardware redundancy by having multiple copies of all of the system nodes that may be distributed onto different hosts (e.g., hosts 1-N) on the PolySync bus 206, where an individual host can include one or more computing devices and/or sensor hardware, as well as the related software and applications 402 implemented for each host that participates in the PolySync system. Each of the hosts can manage and process multiple applications 402 that participate on the PolySync bus 206. In the event of hardware damage or failure, dormant nodes can be activated to replace the failed and/or missing nodes. For example, if an automotive electronic control unit (ECU) fails or is damaged (e.g., host 2 at 404), then network multi-pathing instantaneously (or approximate thereof) switches to a secondary PolySync bus 406. The ECUs at nodes 408 (e.g., host 1) and 410 (e.g., host N) can recognize and/or determine the failure condition and activate dormant backup nodes, allowing operations and/or a mission to continue safely.

Manager-Node Architecture

Figure 5:
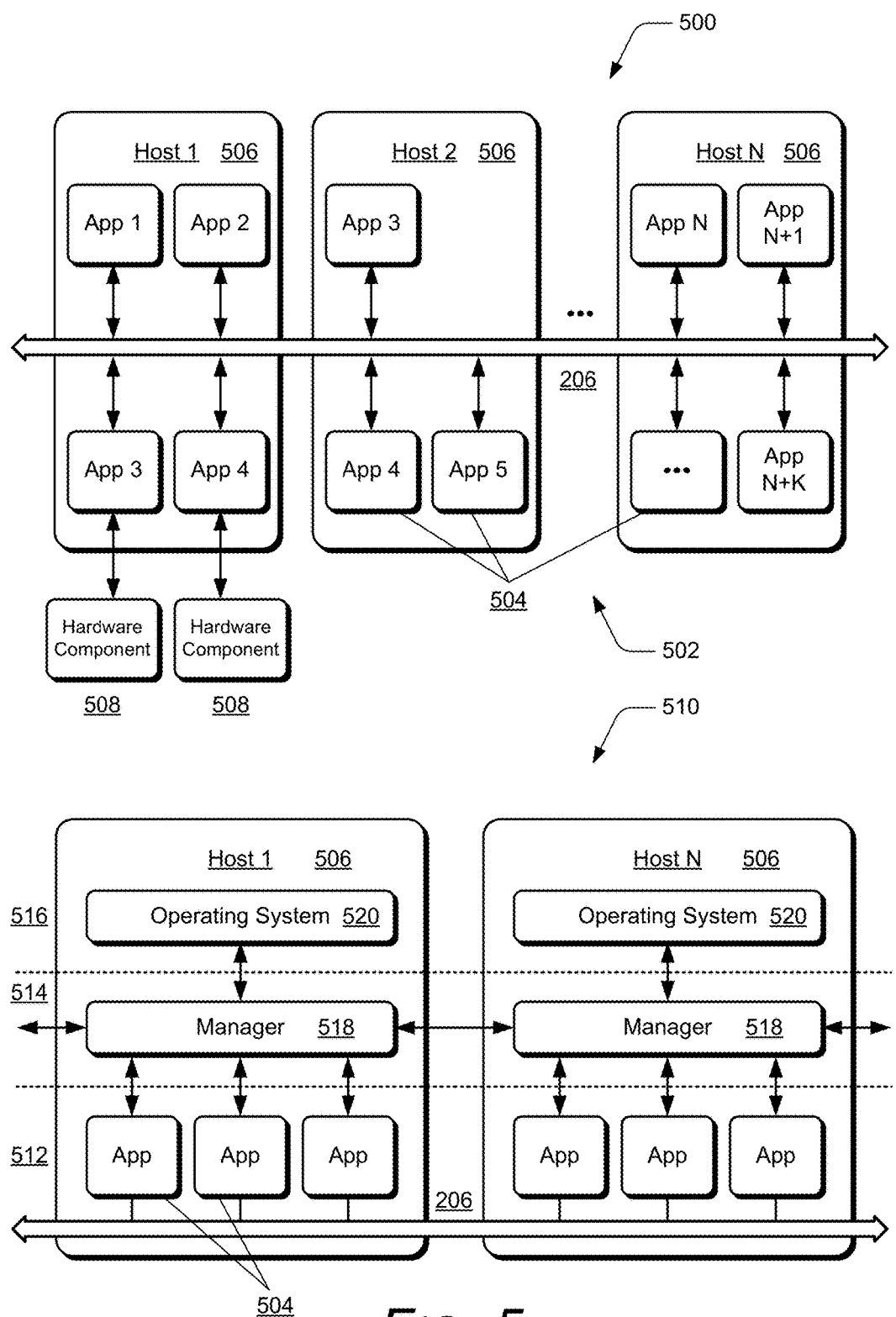
FIG. 5 illustrates an example manager-node architecture within the system that implements an autonomous vehicle interface system in accordance with one or more embodiments.

FIG. 5 illustrates an example manager-node architecture 500, which further illustrates the details of the system architecture 200 that is shown and described with reference to FIG. 2. The manager-node architecture 500 includes multiple, different "hosts" (e.g., hosts 1-N) on a network represented by the PolySync bus 206 of the system architecture 200. The example manager-node architecture 500 illustrates a PolySync physical architecture 502, in which K-applications 504 (e.g., software applications, components, modules, and the like) are distributed among N-computing devices 506 (e.g., the hosts 1-N) on a network. The manager-node architecture 500 also illustrates hardware components 508, such as sensors, that communicate sensor data to the one or more applications 504. In implementations, a host 506 may be a desktop computer, a Linux machine, or other computing device, and the hardware component 508 can be a GPS and Lidar sensor. Generally, the architecture is scalable, such as where a host 506 may be representative of the actual GPS unit and the hardware component 508 is the antenna for the unit. Any number of various combinations of computing devices, hardware, and sensors, as well as the related software and applications are considered.

The example manager-node architecture 500 also illustrates a PolySync software architecture 510 that identifies an application layer 512, a management layer 514, as well as an operating system and hardware layer 516. The application layer 512 encompasses the applications 504 across all of the hosts 506 in the network system, and the applications include executable processes that generate, receive, communicate, and/or process data. The manager-node architecture 500 exposes the management layer 514, which is implemented and responsible for overall system oversight and interaction with the respective host system. The operating system and hardware layer 516 interfaces the hardware (e.g., integrated circuits and components) and includes the operating system 520 for each of the respective hosts 506.

The manager 518 of each host 506 interfaces with the operating system 520 of the operating system layer 516, such as to query system time, request system load status, and networking interface. All of the data communications still take place over the unified publisher-subscriber and get-set data busses 206, but they are separated into inter-process communications between host managers 518 and between the applications 504. A manager 518 of a host 506 not only functions as an abstraction layer between the system and an application on the system, but also manages the state of the applications 504 and which applications are instantiated on a particular host. The managers 518 in the management layer 514 communicate with each other to monitor the system as a whole, and each of the managers 518 know the health (e.g., the operational status) of each of the other managers in the system. If one of the host systems becomes inoperable, then the other host managers in the system can adapt and take over the operational responsibilities of the inoperable system.

Each host manager 518 of a respective host 506 is responsible for various tasks that include application management, which involves the instantiation and destruction of other nodes, health monitoring of the applications 504, and adaptive redundancy. A host manager 518 is also implemented to manage the synchronization of distributed system clocks, to establish and manage a shared-memory wall clock, and for processing and network load monitoring. The shared-memory wall clock is further described with reference to distributed timing shown in FIG. 13. The host managers 518 also intercommunicate to share status information with each other for such tasks as automated load balancing and hardware failure compensation, as shown and described with reference to respective FIGS. 6 and 7.

Example methods are described herein in accordance with one or more aspects of an autonomous vehicle interface system. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
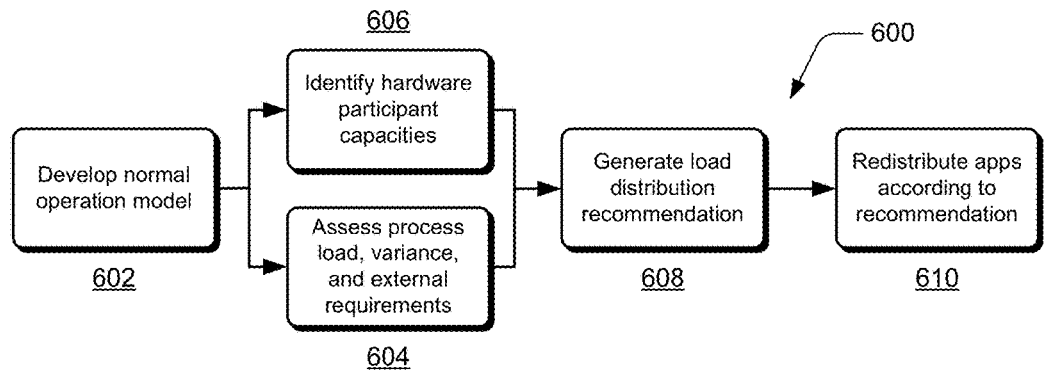
FIGS. 6 and 7 illustrate example algorithms in implementations of the manager-node architecture in accordance with one or more embodiments of an autonomous vehicle interface system.

FIG. 6 illustrates an example load balancing algorithm 600 as implemented by the host managers 518 of the respective hosts 506 in the manager-node architecture 500 described with reference to FIG. 5. The host managers 518 communicate and are implemented to work together to move applications 504 to machines (e.g., computing devices) that have available capacity. This process is used to optimize hardware utilization and minimize the common "overkill" that comes with non-deterministic software-hardware pairings. The load balancing algorithm 600 first develops a model 602 of normal operation of the system as configured a-priori by a user, and may be implemented by use of statistical techniques, genetic algorithms, machine learning, or other techniques to generate the model. The algorithm 600 then analyzes 604 each process for overall load and variability over time, as well as determines 606 any external requirements such as physical hardware availability. Using this information, the algorithm generates 608 a load distribution recommendation using optimization techniques, with the goal of minimizing load across all host participants. The processes on the various hosts 506 can be moved from one host to another, and are all run-time instantiations in the system.

Finally, the host managers 518 take action based on the algorithm to redistribute 610 the application layer 512 as necessary to achieve the recommended configuration. For example, the state of an application can be suspended and shut down, and then re-instantiated on another host. In embodiments, dynamic drivers are implemented to generate (e.g., spawn) applications as opposed to building a static application, or instantiating a static application. The system actually spawns off the dynamic drivers to instantiate an application while the host is processing. Because it is actually a run-time instantiation of an application, an unlimited number of applications and dynamic drivers can be generated as-needed and where needed, which facilitates the load balancing. Because there is no software that is inherently tied to a particular host machine, the applications can all be implemented as run-time instantiations. The load balancing algorithm 600 may also generate a hardware utilization metric that indicates the capacity to which the processing hardware on the system is being under or over utilized. This information can be useful in determining the lowest-cost of hardware necessary for a system to operate properly.

Figure 7:
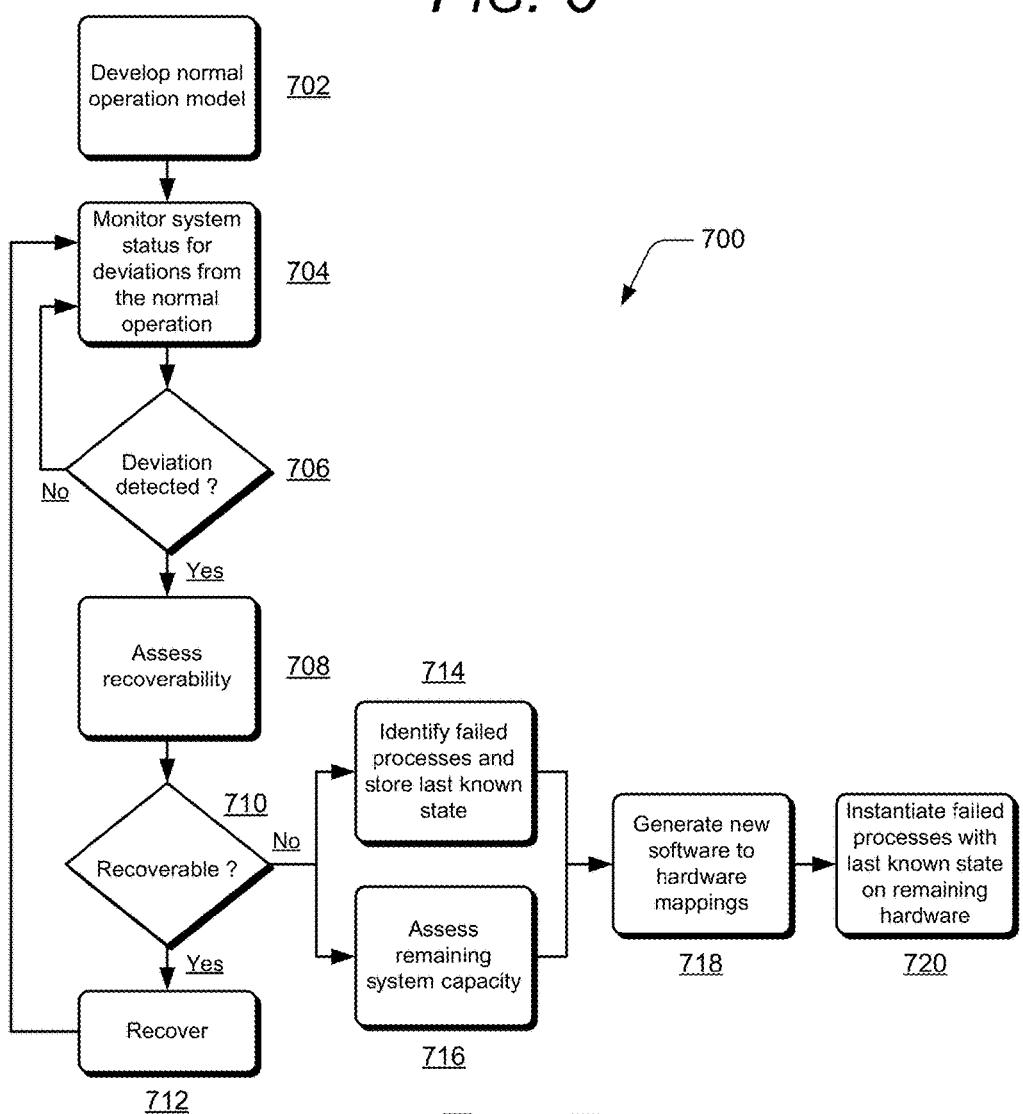

FIG. 7 illustrates an example adaptive redundancy algorithm 700 for hardware and/or software failure compensation as implemented by the host managers 518 of the respective hosts 506 in the manager-node architecture 500 described with reference to FIG. 5. Utilizing the same algorithm method as described with reference to FIG. 6 for load balancing, the host managers 518 can respond to system failures by redistributing applications 504 to remaining operational systems, thus implementing an adaptive redundancy of the system. In this example, the normal operation model 702 includes watchdog-type messaging (also commonly referred to as heartbeat device messages) with frequency expectations so that normal operation of the host managers 518 and the applications 504 is known. Accordingly, the algorithm monitors 704 the system status for deviations from the normal operation. This capability can be used for any fatal hardware or software failure, which is a critical capability for autonomous vehicle systems where there is often no fail safe state, in which case systems must fail operational. The algorithm 700 monitors to detect 706 deviations, and assess 708 the recoverability of a hardware or software failure.

If a hardware or software failure is determined 710 to be recoverable, then the host managers 518 implement to recover 712 the hardware or software failure, and the algorithm continues to monitor 704 the system status. In implementations, an application may be able to self-recover or a host manager 518 may be able to initiate a recovery of the application, such as to terminate the process and restart it, terminate a different process and restart it, send a reset command to a sensor, and/or any other type of recovery process. However, if the hardware or software failure is determined 710 not to be recoverable, then the algorithm 700 identifies 714 the failed processes and stores the last known state, as well as assess 716 the remaining system capacity.

In the case of a non-recoverable failure, something at the system level has failed and is not likely fit to run processes, particularly in the context of an autonomous vehicle. Generally, a data fusion algorithm (e.g., as further described below) can be utilized to determine whether a host 506 still has enough reliable data to remain an active host on the PolySync bus and operate safely, such as if one sensor has failed and is no longer providing data, but a consensus view can still be established based on the remaining sensor inputs. Based on the adaptive redundancy algorithm 700, the host managers 518 generate 718 new software to hardware mappings, and instantiate 720 the failed processes with the last known state on the remaining operational hardware of the system.

Brain Concept Architecture

Figure 8:
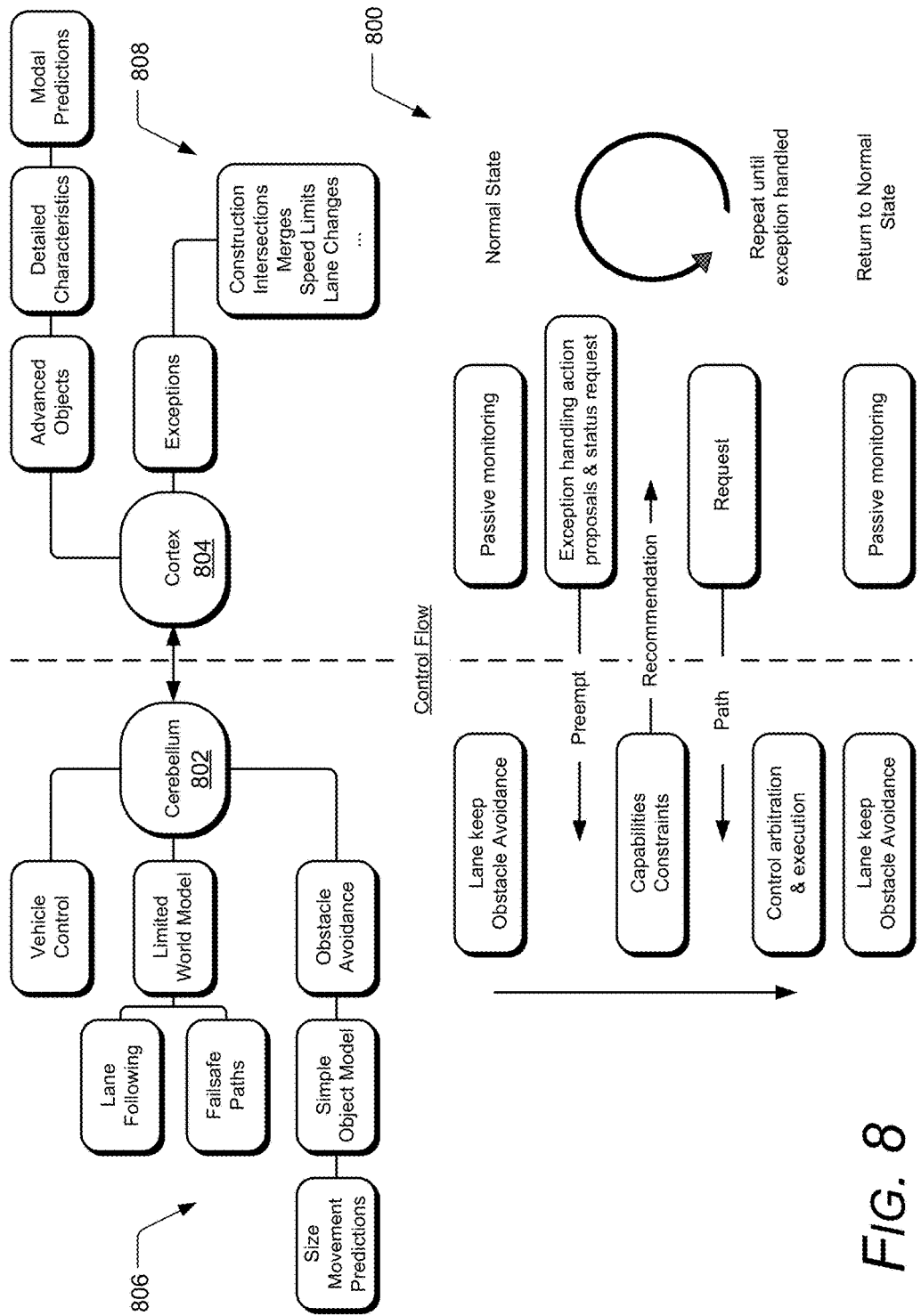
FIGS. 8 and 9 illustrate an example concept architecture for an autonomous vehicle interface system in accordance with one or more embodiments.

FIG. 8 illustrates an example concept architecture 800 for the autonomous vehicle interface system described herein, and illustrates a brain concept architecture that, on a high-level, generally reflects the autonomous vehicle interface system. The assumption of having a safety problem in conventional automotive systems is based on the assumption that the systems can always fail back to a "safe state", and intelligent safety systems are designed to fail and return control to the driver. However, as these systems become more advanced, taking over more of the vehicle control, drivers may disengage (e.g., "tune-out") from their environment and become incapable of resuming control of the vehicle, particularly in a driving situation that requires a quick response. In full autonomous driving systems, the driver may not have access to the vehicle controls at all, and in these systems, there may not be a failsafe state for the system to fail back on.

The concept architecture 800 is generally thought of in terms of brain functions, where cognition and control capabilities are split into two independent, but inter-functioning subsystems anecdotally called the "cerebellum" 802 and the "cortex" 804. These terms are chosen merely for illustrative discussion and indicate a focus on higher and lower order perceptual responsibilities as related to the autonomous vehicle interface system, but do not necessarily correspond to or imply the responsibilities of biological brains. In embodiments, the autonomous vehicle interface system is designed to fail operational, rather than just "fail safe" because there may not always be a safe state for the system to fail back on.

The cerebellum 802 is responsible for short-term actions that require only limited planning and knowledge of the environment. In an automated vehicle, these are primarily lane following and obstacle avoidance. The cerebellum 802 focuses on the low-level, fairly inflexible operations in the real-World driving experience. It is also responsible for interacting with the vehicle chassis controls (e.g., throttle, brake, steering, shifting, wipers, turn signals, etc.), arbitrating and executing control requests from the general cerebellum system 806, those of the driver, and/or those of the cortex system 808.

The cortex 804 is responsible for higher-level perception and planning, and focuses on the high-level "thinking" tasks. It creates a much more detailed representation of the world, including advanced objects such as pedestrians, bicycles, cars, etc., and can predict the behaviors of such objects for future path planning and avoidance. Generally, the high-computing, high-sensing cortex 804 is responsible for the more advanced functionalities, such as high-level path planning, mapping, change detection, advanced vision, and the like. This cortex system 808 can be implemented to include the advanced computing cores and the advanced sensors that may be redundant with similar components of the cerebellum system 806 for data verification, for instance. Essentially the cortex 804 (e.g., the high brain) initiates requests to the cerebellum 802 to deviate from a normal operation mode (e.g., lane keep and object avoidance) because the cerebellum is the gateway to actually controlling a deviation operation, such as changing lanes, traveling through an intersection or construction zone, or other type of deviation from a normal mode.

With reference to the autonomous vehicle interface system, the advanced cortex-level processing can completely shut down or break, and the cerebellum 802 will still operate a vehicle safely. The important feature is to fail in an operationally safe state, which is to maintain the vehicle lane and avoid obstacles, and then attempt to follow a safe path to stop the vehicle. In implementations, the cerebellum aspect of the autonomous vehicle interface system is a fail operational state. In a failsafe path, the vehicle should have visibility beyond its stopping distance and have a map available, such as to identify intersections so as not to travel through an intersection without stopping. Accordingly, a model implementation of the cerebellum 802 in the autonomous vehicle architecture will handle the various tasks of lane following, obstacle avoidance, generating failsafe paths, and handling vehicle interactions for a fail operational sub system.

Figure 9:
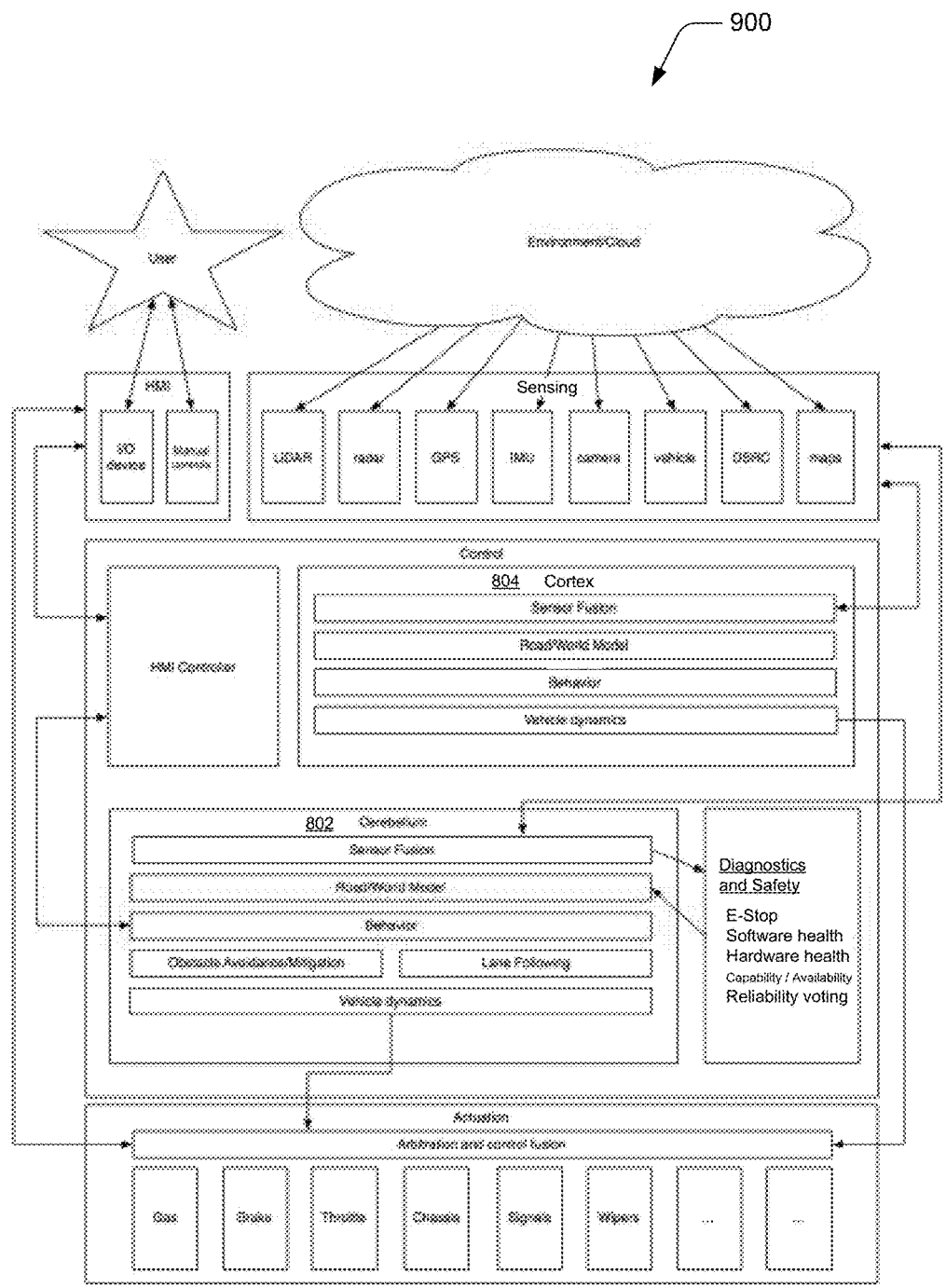

FIG. 9 further illustrates the example concept 800 described with reference to FIG. 8 for the autonomous vehicle interface system described herein, and illustrates an integration of a high-level brain architecture 900 in the overall system architecture. Generally, the cerebellum 802 would keep an autonomous vehicle following at a safe distance behind the car ahead and steering within the lines of the lane. The cerebellum 802 can determine out how to make a pass, yet if the passing operation fails, the cortex 804 will know how to achieve a safe operational state by resuming the original mission (e.g., safe following staying between the lines). In another example, if the vehicle encounters a patch of ice during the passing operation, the cortex 804 takes over and regains control of the skid. Fundamentally, most of driving a vehicle (by a person) is avoiding objects and lane following or keeping within the lines, or in the case of undeveloped roads, keeping the vehicle on the right-hand side of the road and staying within the designated travel corridor. A driver is generally not performing advanced object processing to avoid objects and travel within a designated lane, and a driver has a really good understanding of the vehicle dynamics, such as not to skid around on ice or to know how hard to take a corner. A lot about driving is the experience, the feeling. A driver feels his car as he is traveling along, but doesn't necessarily think about all of the driving fundamentals to maintain general vehicle operation and control in a limited World experience.

Fault Management and Diagnostics System

Figure 10:
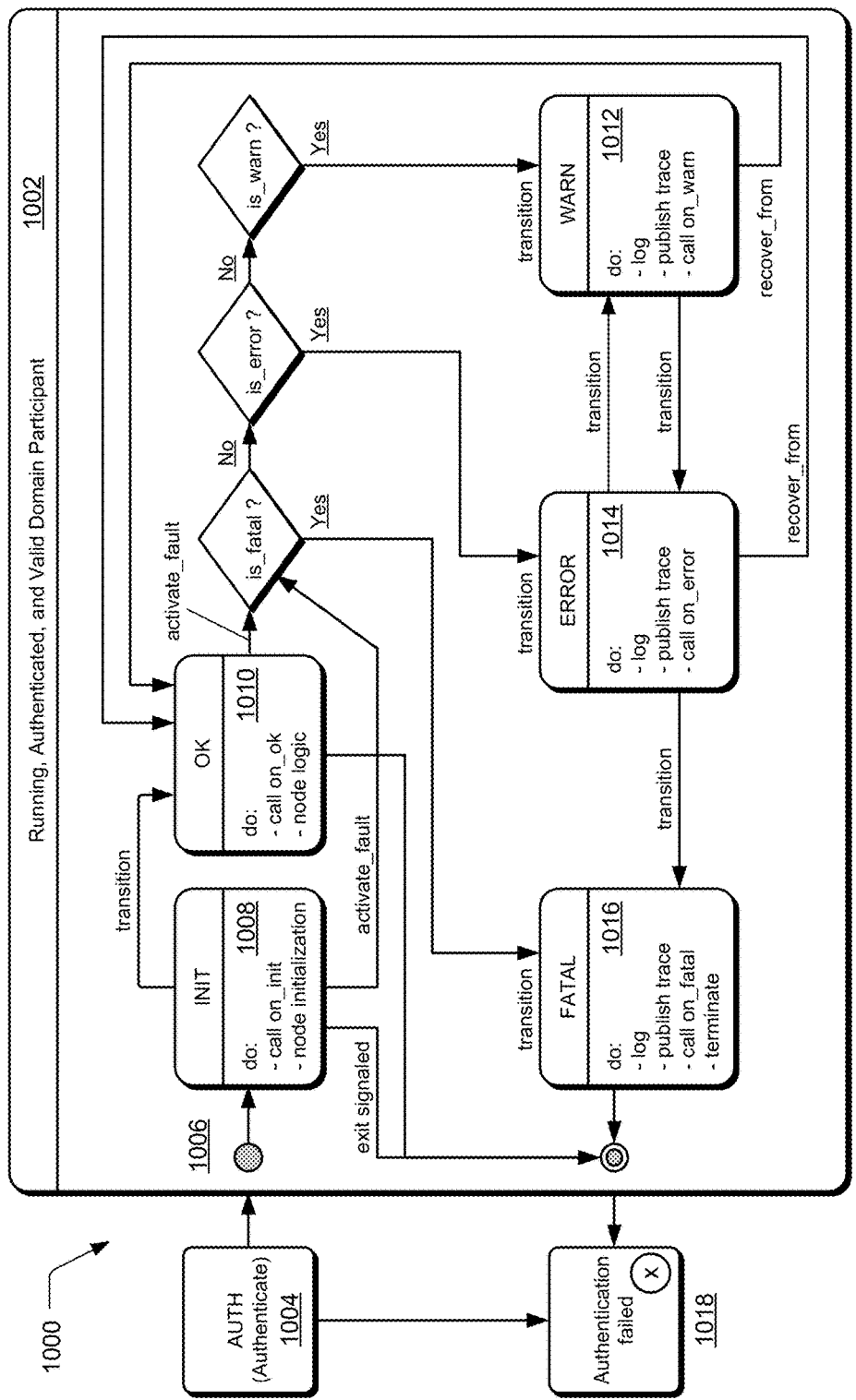
FIG. 10 illustrates an example state machine for a fault management and diagnostics system that can be implemented in the manager-node architecture in embodiments of the autonomous vehicle interface system.

FIG. 10 illustrates a state machine 1000 for a fault management and diagnostics system that can be implemented as part of the manager-node architecture in embodiments of the autonomous vehicle interface system. Autonomous vehicles operate with a high degree of complexity and interdependency that makes them susceptible to fatal or cascading failures. For safety, a deterministic state model of applications is generalized that allows actively handling faults before they can become failures. The state machine 1000 is described for a running, authenticated, and valid domain participant 1002, such as an individual node and/or application. The state machine defines the node states and transitions into the states that gives an application the ability to intervene in a fault condition, report the condition, attempt to recover, and otherwise enter a "failsafe" state.

A variety of methodologies can be utilized to detect fault conditions, including statistical comparisons, voting, as well as machine learning, genetic algorithms, etc. Fault reporting can be implemented in the form of Diagnostic Trouble Codes (DTCs) and recovery actions are reported with Mitigation and Recovery Codes (MRCs), which are a set of static conditional definitions represented by integers. Recovery methodologies can be implemented by a programmer and are system or application dependent, and may require a failsafe or fail operational default state depending on the safety criticality of the process.

A "failure" occurs when an observed behavior differs from the expected behavior (noting that the reference is the expected behavior, not the specification, since even the spec could be false). An "error" is the part of the system state that may lead to a failure, and a "fault" is the cause of an error, where a software fault occurs in the software as an information fault that affects software, programs, or data, and a hardware fault occurs in the hardware as a physical fault that originates in, or affects, the hardware. Generally, faults are handled so as not to lead to cascading errors and/or so that they are traceable. A fault can be detected in various ways implemented in the system, where a fault condition is reported, an attempt is made to recover from the fault, or otherwise enter a failsafe state or a fail operational state. The system includes a template so that the programmers can define these as standard operating states in all of the nodes, and then a general operating state of all nodes on the bus that use this definition is known.

A node can include any one of various states after fault activation. An authenticate state AUTH 1004 indicates that a node is currently being authenticated, does not have a GUID, and is not an active domain participant. The node can be instantiated at 1006 by psync_init( ) and then permitted on the PolySync bus when authenticated. An initialization state NIT 1008 indicates that the node is initializing, has a GUID, and is a domain participant. An operational state OK 1010 indicates that the node is running as a domain participant. A warning state WARN 1012 is a fault set of the node that indicates a fault may lead to a failure, can continue, can recover, and auto-recovery is typically handled by code. An error state ERROR 1014 is a fault set of the node that indicates failure will occur, fault is fatal to the operation but not the application, and user-intervention is typically required to recover. A fatal state FATAL 1016 is a fault set that indicates failure will occur, fault is fatal to the application, not recoverable, and the application may terminate to prevent data loss (or further data loss). Authentication of the node may also fail at 1018. The goal for a particular node is to define behaviors for all possible faults, and to recover when appropriate. An API (application programming interface) can be utilized to facilitate these with callbacks, nodes define the code, the API decides when to call, and can be triggered by many different faults.

Domains Architecture

Figure 11:
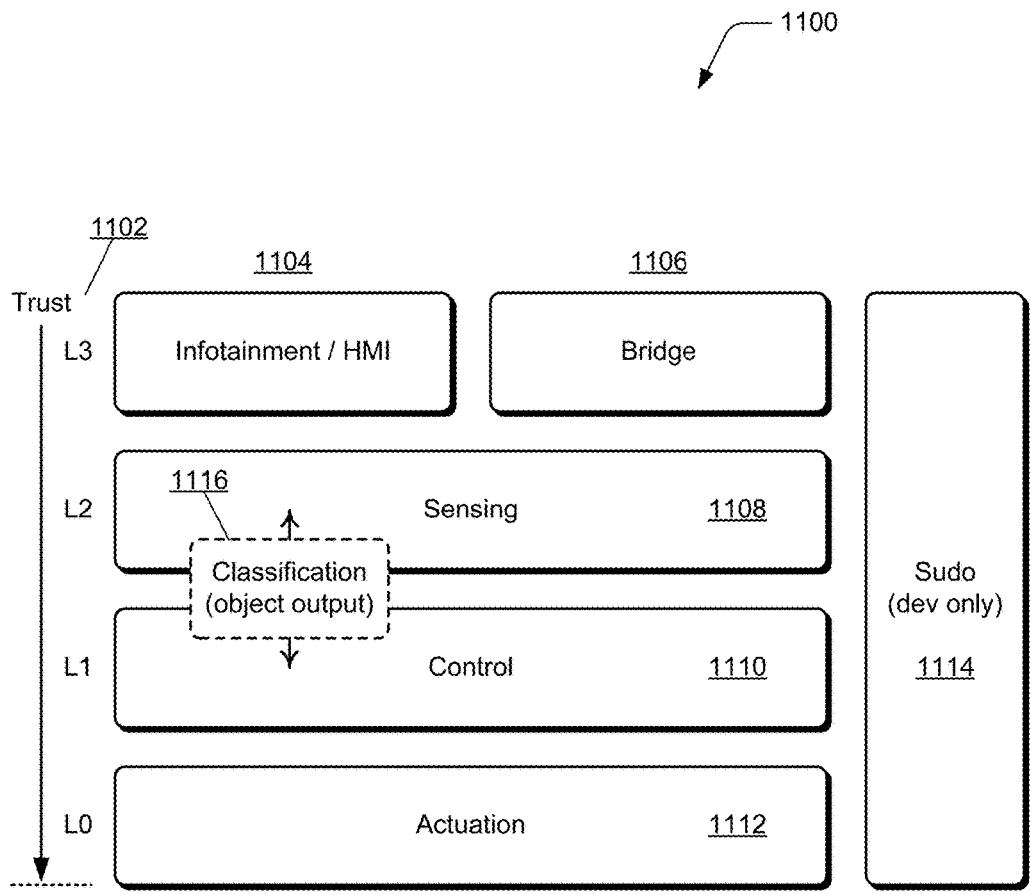
FIG. 11 illustrates an example domains architecture that can be implemented in the manager-node architecture in embodiments of the autonomous vehicle interface system.

FIG. 11 illustrates a domains architecture 1100 that can be implemented as part of the manager-node architecture in embodiments of the autonomous vehicle interface system. Highly automated vehicles must implement robust and secure mechanisms to prevent malicious activity. Because these systems are computerized, they are susceptible to a broad spectrum of well-developed attack methods. In embodiments of the autonomous vehicle interface system, PolySync implements application domains having trust levels 1102 that are established with respect to safety responsibilities of the hardware and software components. The domains are analogous to permissions levels, where the applications in an application level only communicate with the other applications in their particular domain. The domain trust levels 1102 may correspond to a level of a-priori knowledge, authentication procedures, frequency of re-authentication, or other security verification techniques. Some applications can be members of multiple domains, which controls inter-domain communication with specific gateway applications. This facilitates a communication security function, which applies to safety of the autonomous vehicle interface system in the presence of malicious activity. The domains also isolate critical processes from each other and from the potential malicious activity.

In this example, the domains architecture 1100 implements a level three (L3) trust level that includes infotainment 1104 for onboard entertainment and driver information systems, and includes a bridge 1106 for external communication dynamic drivers, such as for Bluetooth™, Wi-Fi, and DSRC. The domains architecture 1100 also implements a level two (L2) trust level that includes sensing features 1108 for onboard sensing dynamic drivers (e.g., LIDAR, radar, GPS, inertial, camera, CAN, etc.) and sensing applications (e.g., fusion, classification, terrain characterization, etc.). The domains architecture 1100 also implements a level one (L1) trust level that includes control features 1110 for the higher-level applications with chassis control access (e.g., for high and low-level path planning) The domains architecture 1100 also implements a level zero (L0) trust level that includes actuation features for chassis actuation dynamic drivers, such as for by-wire control interfaces. The domains architecture 1100 also implements a sudo feature 1114 as root access for experimental and development use.

In a communication security implementation, applications within each domain have varying degrees of security associated with them, and the security levels protect against acts, where higher security systems typically have fewer ways to access them and higher restrictions on the access. For example, the access to the level zero (L0) domain for actuation 1112 has very restricted access as to which applications can actually control vehicle actuators, such as to provide vehicle steering and other control inputs. An application that would have access to initiate actuation controls at the level zero (L0) trust level would also have access at the level one (L1) trust level in the control domain, and is implemented for gateway communications between the domains. An application that bridges domain levels at 1116 can not only check that received data comes from a reliable source before passing it into a higher level of trusted domain, but can also determine whether the input is situationally valid as an autonomous vehicle input at the point when the data is received. In context of the manager-node architecture 500 described with reference to FIG. 5, each of the various applications 504 that are distributed among the hosts 506 are assigned to at least one of the domains in the domains architecture 1100.

Shared Memory and Distributed Timing System

Figure 12:
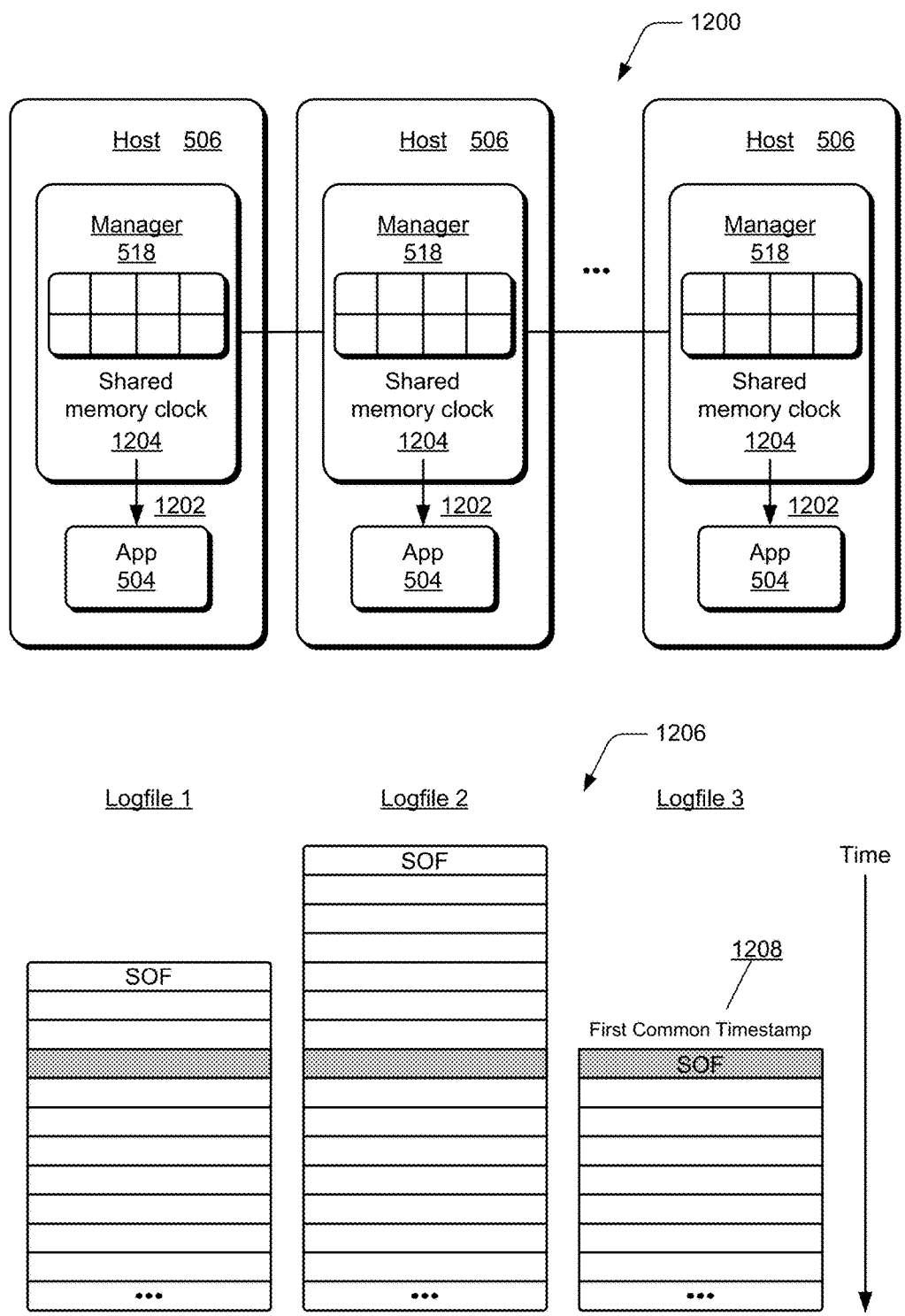
FIG. 12 illustrates an example shared memory and distributed timing system that can be implemented in the manager-node architecture in embodiments of the autonomous vehicle interface system.

FIG. 12 illustrates a shared memory and distributed timing system 1200 that can be implemented as part of the manager-node architecture 500 described with reference to FIG. 5 in embodiments of the autonomous vehicle interface system. The PolySync system is a distributed system that may contain an unlimited number of the hosts 506 with the applications 504 (e.g., "apps" or "nodes") running on them (as described above with reference to FIG. 5). Many operations of these applications 504 require precise timing that is accurately synchronized with other participants on the network (e.g., the PolySync bus). This presents a challenge because many non-deterministic functions are required for inter-process communications, and there may be a lag in the communications between participants so they can't practically broadcast their internal clocks on the network directly.

However, in embodiments of autonomous vehicle interface system, local clocks are created that are synchronized continuously among the managers 518 of the hosts 506 in the management layer 514, and the hosts are therefore able to broadcast 1202 a clock signal 1204 to the applications 504 on a respective host with minimal lag. The challenge here is to create an accurate shared clock that scales linearly with the number of the hosts 506 instead of the applications. In the management layer 514, the hosts 506 are communicatively linked together for a shared memory clock 1204 that can be broadcast to all of the applications 504. Further, the shared memory clock 1204 is accessible by all of the applications 504 on a respective host 506 in shared memory for fast data access.

Another challenge for distributed systems is synchronizing start and stop of log file replay. Despite accurate timing across the network, the log start time for each node (e.g., at the hosts 506) will have some variability that will manifest as poor synchronization if using the start of file (SOF) to align the files. However, in embodiments of an autonomous vehicle interface system, a set of log files 1206 to be replayed are analyzed to determine the "first common timestamp" 1208, which is typically the first entry of the latest SOF. The shared global conditional variable can then be shared to broadcast a start time and the tick count at which to start playback of the log files.

Figure 13:
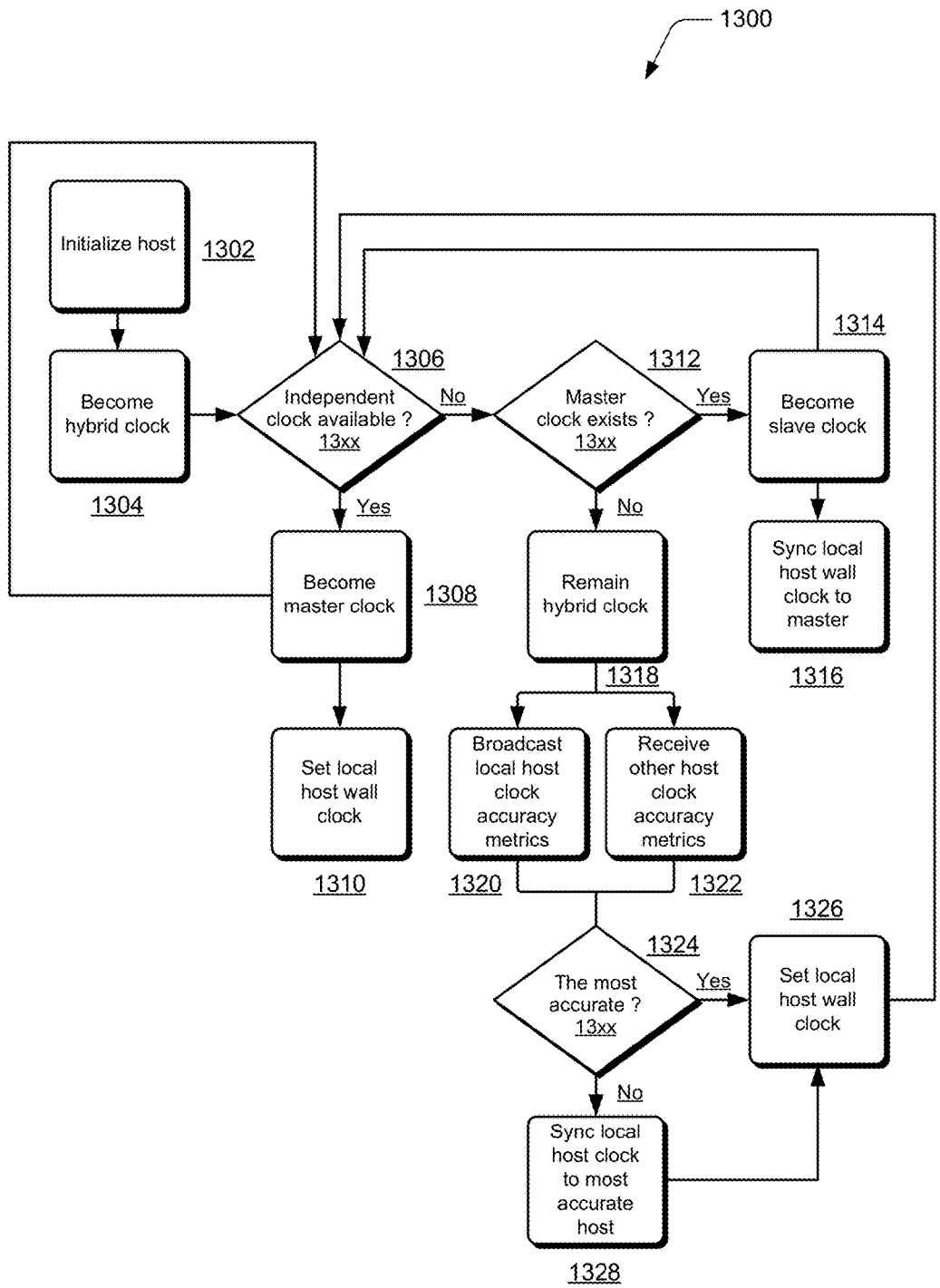
FIG. 13 illustrates an example distributed timing algorithm for setting a local host clock to a synchronized global time in embodiments of an autonomous vehicle interface system.

FIG. 13 illustrates an example distributed timing algorithm 1300 for setting a local host clock to a synchronized global time in embodiments of an autonomous vehicle interface system. A host 506 is initialized 1302 and the host clock is set to hybrid mode to become the hybrid clock 1304, where the clock can act as a master or slave clock depending on the behavior of the other hosts 506 on the network. A determination 1306 is then made as to whether there is an independent source of timing available, such as GPS or scientific clock sources. If an independent clock source is available, then the host (e.g., initialized at 1302) becomes 1308 a master of the clock and causes all of the other hosts to become slaves to the clock, and the local host wall clock is set 1310.

If an independent clock source is not available, then a determination 1312 is made as to whether a master clock already exists, and if not, the initialized host becomes 1314 a slave clock and syncs 1316 the local host clock to the master clock. Alternatively, if the host clock remains 1318 a hybrid clock in the hybrid mode, all of the other hybrids on the network cooperate to determine the most accurate clock on a continuous basis. This is accomplished by broadcasting 1320 local host clock accuracy metrics and receiving 1322 other host clock accuracy metrics. A determination 1324 is then made as to whether the hybrid clock is the most accurate, and if it is, the shared memory "wall clock" in the local manager is set 1326 to the local host clock. If the hybrid clock is not the most accurate, then synchronize 1328 the local host clock the most accurate host, and again, the local manager is set 1326 to the local host clock.

The wall clock broadcasts a POSIX signal which controls a shared conditional, which is available in the shared memory. Applications can subscribe to this shared broadcast via the shared memory, which gives them access to a synchronized global clock tick and other shared resources. The wall clock entity in memory includes an interrupt ticker and a global conditional variable that can be used to synchronize processes to an absolute point in time. This is very useful for synchronizing operations across all machines (e.g., the hosts 1-N) on the network, such as starting and stopping, and recording or replay of log files. The shared memory has an interrupt timer (or interrupt ticker) that sends out ticks counting up at a known time. For example, every ten milliseconds it sends out an interrupt to all of the applications on a host, and also sends out the global conditional variable that can be used for synchronizing.

PolySync System and Viewer

Figure 14:
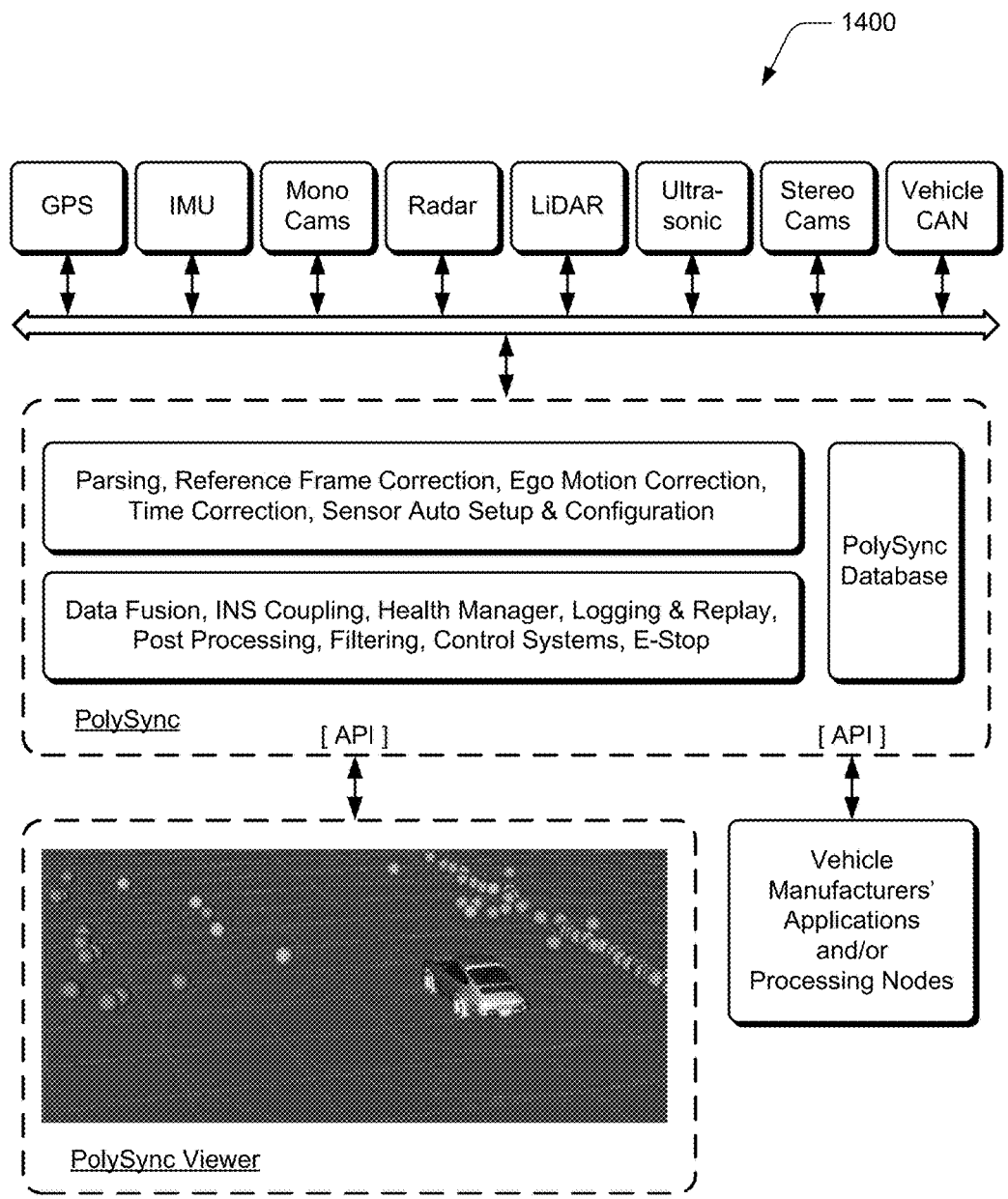
FIGS. 14-17 illustrate examples of features of the system architecture that implements an autonomous vehicle interface system in accordance with one or more embodiments.
Figure 15:
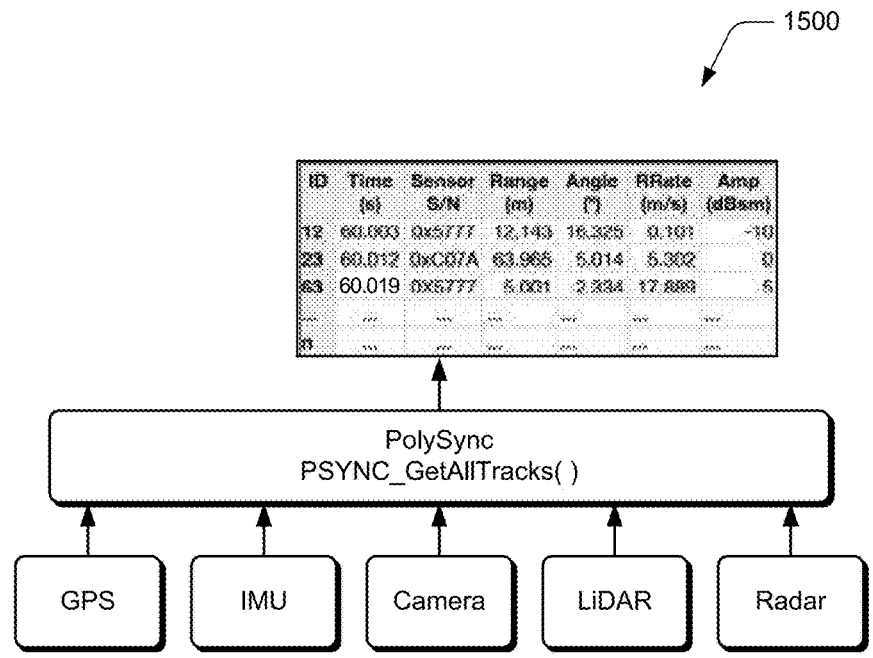
Figure 16:
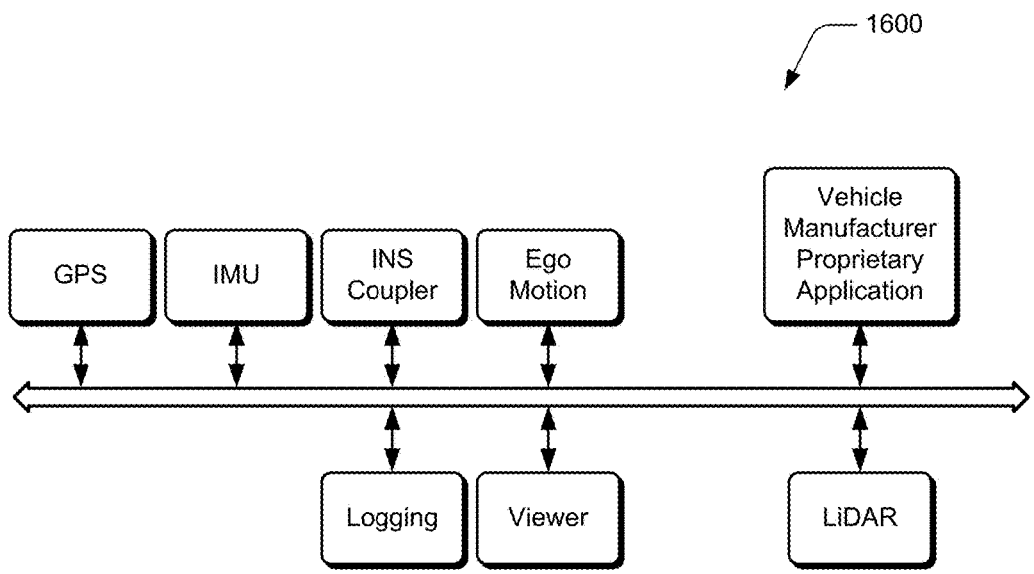

FIGS. 14, 15, and 16 illustrate respective examples 1400, 1500, and 1600 of the PolySync system and PolySync Viewer features of the system architecture 200 that incorporates the manager-node architecture 500 to implement embodiments of an autonomous vehicle interface system, as shown and described herein. In the example 1400 shown in FIG. 14, PolySync provides layers of abstraction between low-level data and high-level data, and the PolySync API allows complex software applications to be built invariant to changes in hardware configuration. The applications can include vehicle manufacturers' applications and/or processing nodes (e.g., nodes in C, C++, Matlab/Simulink, etc.). Low-level inputs (e.g., sensor inputs) can be received into an abstraction layer, and mapped to broad sensor categories. The example 1500 shown in FIG. 15 illustrates that PolySync can determine and answer the basic question of "what is around me?", such as for a vehicle, with function calls of PSYNC_GetAllTracks( ) to the PolySync feature of the architecture.

The example 1600 shown in FIG. 16 illustrates that PolySync can be implemented to be fast, scalable, modular, and embeddable for prototype applications all the way up to production deployments, having one tool for the entire program. The many features of PolySync can include any one or combination of distributed computing, a scalable bus over Ethernet (NIC teaming), automated sensor discovery and binding, time stamp correction, high bandwidth streaming, GPU-based video compression and decompression, 100% integrity logging, access to low and high-level data types, filtering functions, system health status monitoring, software E-stop, security access controls, data fusion, and INS coupling. The many functions of PolySync and/or PolySync Viewer can include at least sensing, perception, control, actuation, mission planning, short-term path planning, behaviors, road modeling, a user interface, visualization, and logging, as well as any other functions and/or features that may be implemented for an autonomous vehicle interface system.

Figure 17:
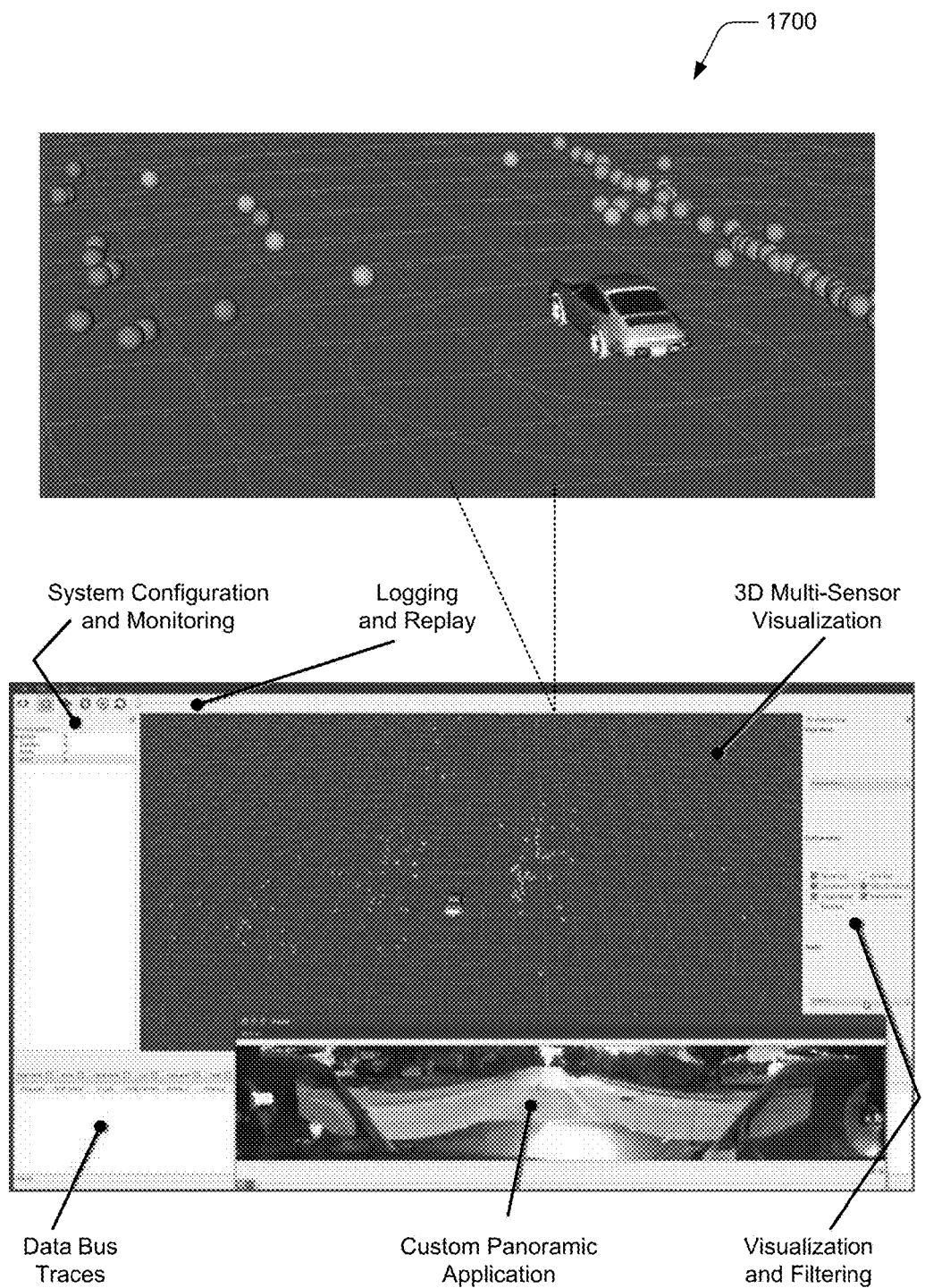

FIG. 17 illustrates an example 1700 of the PolySync Viewer feature of the system architectures that implements embodiments of an autonomous vehicle interface system, as shown and described herein. In this example 1700, PolySync Viewer provides a visualization, logging and playback, and configuration component that is built on the PolySync API. This tool enables plug-and-play visualization of all system sensors, logging and playback, system configuration, and health monitoring of the system. PolySync Viewer supports custom user applications via a plugin framework in multiple languages. Additional features of PolySync Viewer can include any one or combination of rapid user application development (e.g., in QML, C++, etc.), multi-signal plotting, synchronized seek and time-step playback (including video), sensor position setup GUI, system node setup and health monitoring, multiple 3D visualization modes and views, a rich data filtering interface, and real-time full bus traces, as well as any other functions and/or features that may be implemented for an autonomous vehicle interface system.

Figure 18:
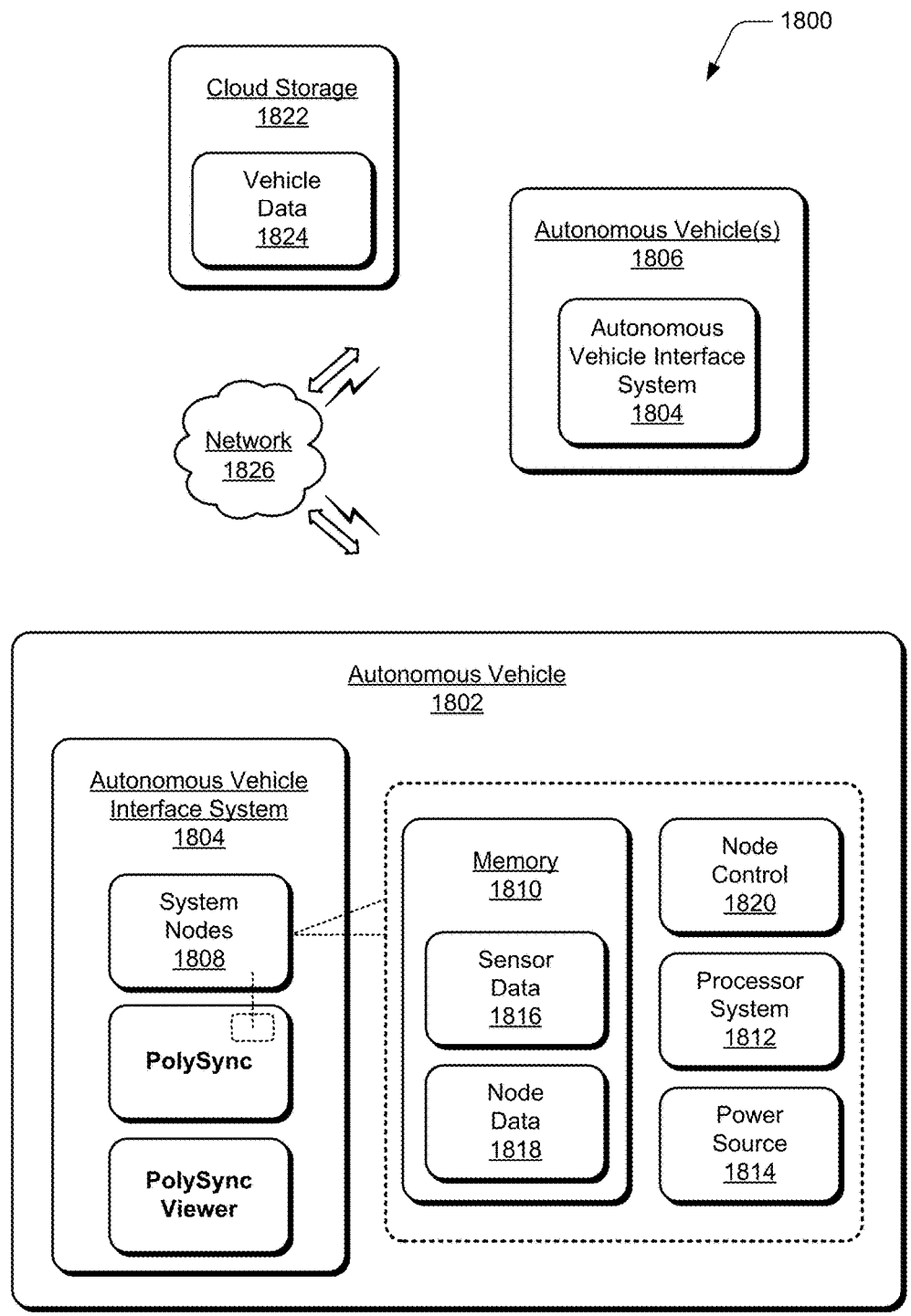
FIG. 18 illustrates an example system in which embodiments of an autonomous vehicle interface system can be implemented.

FIG. 18 illustrates an example system 1800 that implements an autonomous vehicle interface system in accordance with one or more embodiments. The example system includes an autonomous vehicle 1802 that is implemented with an autonomous vehicle interface system 1804 as described herein. The example system 1800 may also include one or more additional autonomous vehicles 1806. The autonomous vehicle interface system 1804 includes the PolySync and PolySync Viewer features described herein, as well as the independent system nodes 1808 of the distributed architecture.

Any of the system nodes 1808 can be implemented with various components, such as a processing system and memory, as well as any number and combination of differing components as further described with reference to the example device shown in FIG. 19. For example, a sensor node includes a memory 1810, a processor system 1812, and a power source 1814, such as any type of battery or other power source that may be implemented in an autonomous vehicle. The memory 1810 of the sensor node can maintain sensor data 1816 (e.g., low-level sensor data received from a sensor), as well as node data 1818, such as processed node data (e.g., high-level system data), configurable settings of the sensor node, and any other type of node data.

The system nodes 1808 include node control 1820 that can be maintained as executable instructions (e.g., a software application, component, or module) stored on computer-readable storage memory, such as any suitable memory device or electronic data storage (e.g., the memory 1810). Additionally, the node control can be executed with the processor system 1812 of the sensor node to implement embodiments of the autonomous vehicle interface system. For example, the node control of a system node is implemented to perform various method operations to implement embodiments and features of an autonomous vehicle interface system.

In implementations, components of the autonomous vehicle interface system 1804 may also communicate to store any type of the node data 1818 and/or any other type of architecture information in network-based data storage (also referred to as cloud-based, or "in the cloud"), shown as cloud storage 1822 that stores vehicle data 1824. Further, any of the autonomous vehicle interface systems 1804 and/or system nodes 1808 described herein can communicate via a network 1826, which can be implemented to include a wired and/or a wireless network. The network can also be implemented using any type of network topology (e.g., a mesh network) and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments, an autonomous vehicle interface system can be implemented for any one or combination of features, including but not limited to, sensing, perception, control, actuation, mission and path planning, behavior determinations, road modeling, user interface, visualization, and data logging. For example, a collision alert system that provides audible feedback for following distance may utilize radar as a spatial sensor to identify targets (e.g., other vehicles, pedestrians, and/or objects, both moving and stationary) in front of the vehicle, and utilize odometry and gyroscope sensors to sense vehicle speed and direction. A perception algorithm can then perform ego motion correction and identify targets as vehicles. A behavior algorithm can then determine whether or not to output an alert to an actuator, such as an audible buzzer.

Figure 1:
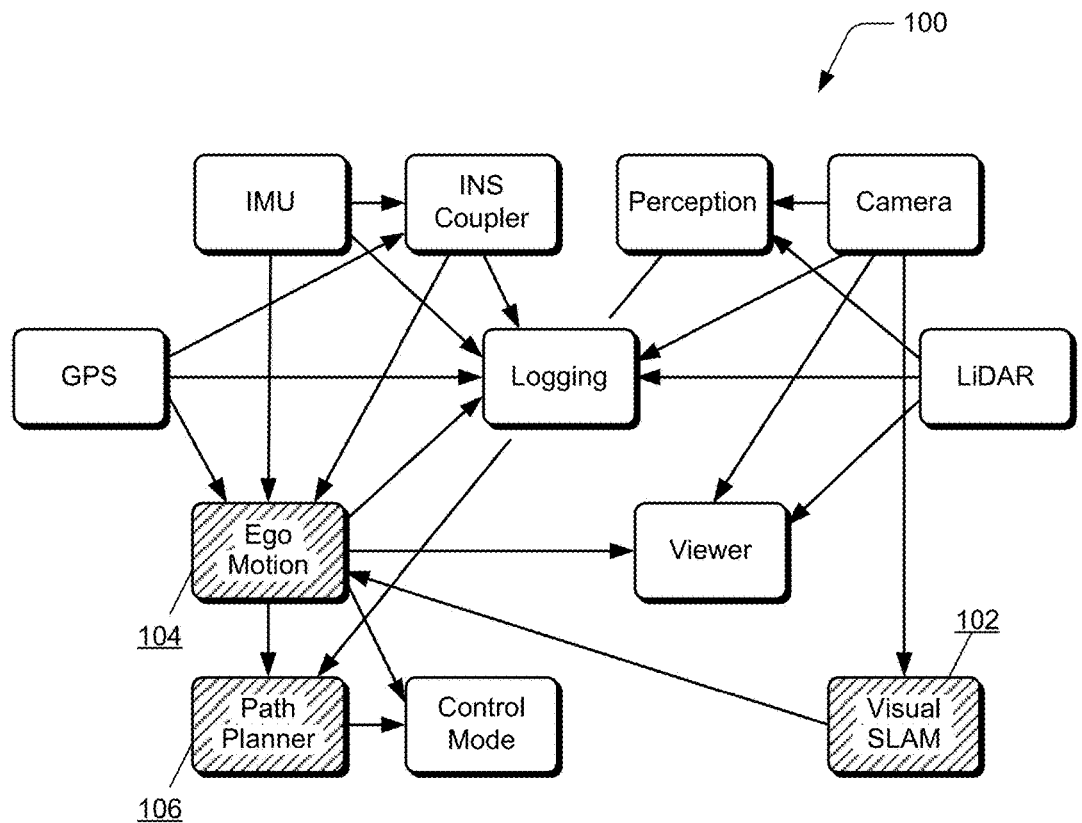
FIG. 1 illustrates an example of a conventional autonomous vehicle system that is implemented with a centralized logging and data processing computer.

As described above, conventional autonomous vehicle systems are designed with an interdependent data architecture, as shown and described with reference to FIG. 1, and are both technology-centric and algorithm-centric. This makes the conventional systems difficult to implement, support, upgrade, and/or troubleshoot, all of which are essential for a production-level computing system. In embodiments of the autonomous vehicle interface system described herein, the system is distributed as a multitude of nodes having functional elements with consistent messaging formats that create a uniform API for interacting with each sensor node, component, and module. The API calls can be uniform for the system architecture, such as PolySync connect, PolySync register, PolySync publish, PolySync subscribe, and any other type of related PolySync and/or PolySync Viewer API call.

All of the different system nodes operate over a shared, near real-time bus (or via a multiple, redundant bus structure) on one or more computing devices, both at a sensor node and/or on multiple distributed devices, in a form of peer-to-peer communication network of the publisher, subscriber architecture nodes. Combined with standardized messaging, this architecture allows easy swap between different modules without tracing dependencies. Each of the nodes can be implemented to operate independently and without knowledge of the other system nodes.

For robustness, the system nodes may be reduced in functionality, increasing the number of nodes on the network, each implemented for a single purpose. For instance, a general controller area network (CAN) parser node would decode CAN data from a radar sensor and make it available on the real-time bus and/or network. A second node can translate the raw CAN data into a spatial messaging format, while a third node may take GPS/IMU (Inertial Measurement Unit) and radar data, perform ego motion and reference frame correction, and make the more generalized data available on the real-time bus and/or network. In this way, levels of abstraction are built in from the low-level data immediately, and in this described example, the sensor-specific node would be the radar translation node. To later upgrade the sensor, a programmer would only need to add the appropriate translation node and the system would work.

In embodiments of an autonomous vehicle interface system, generalized messaging formats are utilized for the API, and the messaging formats include, but are not limited to: spatial/ranging formats for remote ranging sensors, such as LiDAR, radar, camera, ultrasonics, and others; a localization format for sensors providing vehicle pose, location, and dynamic information including GPS, inertial, odometry (including visual), etc.; a video format for video frames (usually compressed); a mission planning format for high-level behaviors and waypoint management; a path planning format for vehicle route path planning; a perception format for perception of objects, such as driveable surfaces, object recognition, lane modeling, etc.; a World model format for full environment modeling; a control format for actuation command and feedback; a heartbeat format that provides continuous operational and/or error status for each node of the architecture, referred to as the "health" of the system;

and a "diagnostic" format that includes appended error traces and node operating states. In addition, embodiments of the autonomous vehicle interface system allow for flexible low-level data types, such as CAN data, Ethernet packets, serial packets, etc. Users (e.g., vehicle manufacturers) may implement their own data formats to handle customized inter-process communication and high bandwidth pipelining.

The modular data structure of the system architecture solves a multitude of problems in implementing, maintaining, and upgrading autonomous vehicle systems. Utilizing the real-time bus and data model, an autonomous system can be deployed as a series of modules, and sensing systems, algorithms, and actuators can be interchanged easily without disrupting the core functionality or stability of the system. The modularity of the architecture provides a significant commercial opportunity for companies to build and supply the modules and components of the architecture as self-contained products that can be developed and upgraded over time. Companies that desire to develop autonomy systems are not forced to hire from the limited pool of competent engineers and scientists, but instead may simply purchase the required modules to enable desired system functionality. Further, the modularity offers the ability to create alternate configurations, all utilizing the standard API calls. For example, instead of a full autonomy system, a company may be interested only in adaptive cruise control (ACC) functionality. Being extensible, the bus adapts accordingly. If the company later wishes to expand to additional functionality (or even full autonomy), the previous system and sensors are easily expanded to incorporate the additional functionality. Since all of the system nodes utilize the same API calls, they can be added to the real-time bus easily to instantly expand the capabilities.

An autonomous vehicle, or active safety systems in general, include a set of sensors that detect and provide information about the surrounding environment, and processing algorithms are implemented to determine what is really happening around a vehicle, and decision making algorithms determine what actions to take, followed by some sort of actuation to affect a change in response to the environment. The system utilizes sensors (e.g., hardware components and features) to detect what is going on in a surrounding environment, and then algorithms (e.g., software features) are utilized to determine what is actually happening in the environment. The challenge is when using a multitude of different sensors, such as multiple LiDAR sensors, multiple radar sensors, vision cameras, ultra-sonic sensors, temperature sensors, sound sensors, light sensors, and any other sensors that may be utilized for an autonomous vehicle system.

Each one of these different and multiple sensors operates with different idiosyncrasies and in different formats, such as over Ethernet, over CAN, they might be USB, and the list goes on. The multitude of different sensors also typically operate asynchronously, providing sensor data out at whatever the specified data rate is that they operate, such as every fifty (50) milliseconds, a burst of sensor data is output for processing. Accordingly, a developer of autonomy or active safety systems has to start an autonomous system program at that level, and has to know or learn Ethernet protocols, CAN protocols, LVDS, USB, as well as figure out the system architecture to be able to bring all the data together and process the data (referred to as data fusion) without too much lag time to determine what the data represents.

Further, the sensor data from the sensor detections all need to be correlated to a single timestamp (e.g., a unified time domain) to correlate when the sensor detections happen in relation to one another so as to accurately ascertain where targets (e.g., other vehicles, pedestrians, roadways, and other objects) are in the surrounding environment and what is happening at that particular moment in time in the surrounding environment. When the data is synchronously correlated, the events that are happening at that particular moment in time in the surrounding environment can be determined. Having correct correlated timestamps, or time order, has a huge effect on the reliability of an overall autonomous vehicle system.

For example, three different sensors may detect a target ("hits" on a target), and a perception algorithm (e.g., a software application) can then determine from a cluster of data from the three different sensors at the location that the target has certain properties, and is likely another vehicle (with some percentage of certainty). Given determined objects (targets) in an environment, the autonomous vehicle interface system can determine how to navigate from one point to the next without hitting the objects. This feature can be implemented by path planning algorithms (e.g., software applications). The system can include a low-level path finding algorithm, such as to determine how to navigate one block of a street, or from a stop sign to the next light, without hitting something. The system can also include a high-level path planning algorithm, such as to determine a path from one city to the next.

From a business standpoint, automotive and other vehicle manufacturers generally tend to focus on the high-level path planning algorithms that are layered above the sensor detection and sensor data processing to determine target location. However, the well-designed, underlying autonomous vehicle interface system is clearly an important and needed architecture of an overall autonomous vehicle system. In embodiments, the autonomous vehicle interface system is a distributed architecture, rather than having on computer managing all of the system nodes, and the one computer fails, then the whole system goes down. With the distributed architecture, the multitude of different computer devices are decentralized and can host different processing modules, so that if one computer device or node fails, it doesn't shut down the whole system. The system nodes on the real-time bus are uniquely identified and can replicate, replace, and/or switch out a node (e.g., a failed or replacement node) based on which nodes are registered and receiving different types of the system data.

In implementations of the autonomous vehicle interface system, a sensor node may be a module receiving input from several sensors, or even several different types of sensors. Generally, each system node is designated to do one specific task, function, feature, etc. However, a unique aspect of the architecture is that all of the data is available to all of the system nodes, as-needed or designated. Conceptually, a single pipe communicates all of the system data for every sensor, module, component, etc. All of the data from every node in the system is available to every other node (e.g., module, component, computer device, etc.) that might be on the system. For example, five radars may generate the raw CAN data, and any of the nodes can receive and parse the CAN data into high-level data types. Generally, any of the system data is not just piped from a point to another point, but rather is available anytime on the real-time bus. The data is published on the real-time bus in the publisher-subscriber architecture in real-time, as opposed to a transmit-and-receive architecture where a node would first have to request the data, receive confirmation that the data will be sent, and then receive the data.

In implementations, a designated node may be providing information that is relied on, and if that node fails, the failure can be detected and a command sent to a different node to kick off the failed node and restart the lost node functions or operations on the different node, or on any one of the other nodes. Similarly, two different nodes may parse the same data, and the two nodes can validate each other for a higher confidence of reliable data. Additionally, if one of the nodes fails, the parsed data will still be available from the other operational node.

In embodiments, the autonomous vehicle interface system is implemented for plug-and-play of the various system nodes. As noted above, the many different sensors of a conventional system typically operate with many different protocols and have different idiosyncrasies as to how they operate. Typically a programmer who is developing an autonomous vehicle system would have to learn how all of the different sensors operate and many different protocols to implement the system. In implementations, the PolySync features of the system architecture can recognize a sensor type, such as a radar component, and will abstract the data from the radar to a high-level radar data type.

The system architecture implements a database of what is available in the system. For example, the system may support a hundred different types of sensors, and can progressively go through each one based on the data stored in the database and test an input until a sensor type is determined. For every different sensor in the overall architecture, the system is implemented to receive sensor data from a new sensor and perform an analysis on the data to make a determination as to the likely sensor model and type. Then the next time that the system is started up, the autonomous vehicle interface system will have the prior knowledge of the system node configurations, and can start up with a much faster response time. This feature is also referred to as "headless", in that the first time the system is initialized, the visualizer feature (e.g., a GUI of the PolySync Viewer feature) can be used to progress through a setup wizard for the initialization process, and on the next power-up, the system nodes do not need to log-in or register on the system.

Once the system is configured, developers for the automobile and other vehicle manufacturers can write their code and communicate with the architecture system when it is powered up via the autonomous vehicle interface system. The autonomous vehicle interface system may also be referred to and/or implemented as a sensor and/or autonomy operating system, where in that context, the autonomous vehicle interface system is preconfigured to include the drivers for the sensors. The drivers are preconfigured and the system unifies and generalizes the data communication between the system nodes so that they are not all different, specific types of data for the many different types of sensors. The system architecture handles the problem of being blind to what sensors, components, modules, etc. may be providing input, and sampling the data input for comparison to the internal system definitions to determine the sensors, components, and modules, and to associate them.

As described above, the sensors of an autonomous vehicle system operate and generate sensor data asynchronously, and need timestamp correction so that they are all in a single time context. Unlike a conventional operating system that uses a scheduler to schedule and complete tasks, or a real-time operating system (RTOS) that has only limited access to libraries and other features, implementations of the autonomous vehicle interface system utilize the hardware timestamps generated by the individual components at the system nodes and corrects them for the system time, which is synched across all of the systems. For example, the CAN modules provide a hardware timestamp, and the Ethernet sensors typically provide a hardware timestamp. Although the timestamps may be different from the many different system nodes, each node is consistent in the timestamp that is communicated from a respective system node. In some circumstances, custom drivers provide system time stamps on incoming data with very low latency.

The timestamps from the system nodes are corrected for the system time, which is synched across all of the systems, based on Network Time Protocol, which is set from GPS signals (because GPS has an absolute timestamp that is universal among all GPS). The GPS corrects the Network Time Protocol, which allows the autonomous vehicle interface system to correct the sensor time, and correlate all of the different timestamps in a format that is a single time domain. This is also useful in a multi-vehicle application because now all of the vehicles will be running on the same time domain.

In implementations, the real-time bus of the system architecture can be expanded to encompass other vehicles, such as for a convoy of multiple vehicles traveling in a line. All of the vehicles can share access to the same real-time bus via wireless communication, where the last vehicle in the convoy would have access to the raw system node data that is being produced by the lead vehicle in the convoy. As long as all of the vehicles in a convoy, or components in a system, are in the same time domain, it doesn't matter their physical location or what they are doing, because the overall system architecture can bring the data together anywhere. These features allow the autonomous vehicle interface system to synch control systems, all based on the universal timestamp. Although having a wireless network between convoy vehicles has been implemented, conventional systems do not interact with the core vehicle systems, creating and allowing universal access on a single time domain. For example, if there was a node fault or failure in the second convoy vehicle, then the second vehicle can use the side scanning radar of the lead vehicle to replace what has failed in the autonomous vehicle system of the second vehicle (e.g., using other vehicle sensors to supplement failures). Similarly, embodiments of an autonomous vehicle interface system can be implemented for any autonomous vehicle and/or any coordinated vehicle system.

When all of the system nodes data and/or sensor data is correlated within the same time, the data can be parsed into flexible data types (also referred to as abstracted data types). In implementations, the autonomous vehicle interface system abstracts the low-level data up to high-level data types, which means that the system nodes can be built on top of the abstracted data types, and the abstracted data types remain invariant, even with respect to changes in the sensor technology or configuration. This is significant because the algorithms do not have to be rewritten or tailored for specific sensors each time that a sensor is swapped out, or when a system node fails and a redundant node replaces the failed node. The flexible data types can be implemented as an abstract container type that is generic, and an object container includes data for position, velocity, acceleration, status, classification, and/or any other type of generalized data, such as for radar, LiDAR, CAN data, Ethernet data, etc. From an API standpoint, a programmer can subscribe to various topics from the PolySync bus, such as to subscribe and receive all of the radar data, or to get all LiDAR points, or get all objects. Further, the PolySync Viewer is built on the API, and a customer (e.g., automobile or other vehicle manufacturer) can build a custom system node right on the bus, and have access to all of the data on the real-time bus, such as to build a path planner, a perception algorithm, or one of the higher-level algorithms. Visualization-only algorithms can be easily prototyped as plugins to the PolySync Viewer rendering pipeline itself.

Another aspect of the autonomous vehicle interface system is a database file that stores the parsing information so it can be determined which signals correspond to what information. For example, given low-level data, the system can obtain specific data from particular sensors, such as a particular binary chunk of bits that indicate a range, and another binary chunk of bits that indicate an angle, and the like. When a new parser or a new sensor is added to the system, this data base file can be updated and then just redistributed, rather than having to redistribute the all of the API codes and related data. This indicates to the system how to parse new sensor.

In implementations, the autonomous vehicle interface system includes a parser node that can be instructed to bind to a sensor, which initiates a look up in the data base for the sensor details to be able to parse the sensor. This feature provides that the coding of the system node never changes, but rather, it's just the database file that changes, which indicates how the node is to operate given a particular input. Accordingly, the code for the parser node does not have to be rewritten every time a new sensor is added to the system, but rather, the definition is just written in the file and provided to the node as a single change of the system. The database file is universal, and updates or new versions can be easily provided to a customer, rather than updating the whole system.

In implementations, the autonomous vehicle interface system includes diagnostic and error checking. For example, a heartbeat message is a continuous signal that is communicated to indicate that status is okay. A diagnostic system implements state and diagnostic system messages, and includes a feature for error traces, such as to track an error propagation path through the system nodes. For example, a node may experience a hardware error associated with lack of power, and the error "travels", such as to a path planner node that relies on a sensor of the failed node. All of the system nodes see the fault message that is generated from the failed node, but the error does not necessarily affect all of the system nodes. The failed node generates the fault diagnostic message, indicating a time of the fault, type of fault, and other parameters associated with the fault. The fault diagnostic message is a container on the real-time bus, and then the failed node enters into a non-operational state (e.g., not running, not okay, wait, warn, and/or a 50% power state).

It is up to the rest of the system nodes whether or not to rely on the information. For example, the path planner node that actually uses that failed sensor gets the message and determines that the message was generated from a node that was being relied on. The path planner can then suspend its function, and enter into a failed or suspended state, and append its own diagnostic message onto the initial fault diagnostic message that was generated previously and communicate it back out. Thus, the diagnostic message now includes the path planner fault information, followed by the low-level fault information, and the times associated with the faults. A programmer can then track how the error traversed through the system architecture and the effect it had on the system.

All of the system nodes receive the information and can individually assess the effect of the error and whether or not to continue operation or enter into a fault state. For example, a system node may determine that LiDAR is no longer available, and attempt to determine whether to allow the vehicle to keep going based on having all of the radar inputs. The system node may assess an increased chance of a collision, so the vehicle may continue at a slower speed, as well as sending out a message to the rest of the system nodes requesting input as to whether to continue.

In implementations, the autonomous vehicle interface system provides for multi-pathing and NIC-teaming, which allows implementation of high bandwidth pipes (e.g., the real-time bus). Generally, one Ethernet cable provides a gigabit and two Ethernet cables provide two times a gigabit, and there is automatic handling for creating that as one unified large pipe. The autonomous vehicle interface system also implements multi-pathing, such as for communication of a large amount of camera data over the bus that would require a higher bandwidth. The feature of multi-pathing provides for redundancy if there is an error, or for example, if one of the main computers that is performing path planning or something really important is disabled. Alternatively or in addition, a cable may be cut and system nodes are then connected via alternate data communication cables. For example, the autonomous vehicle interface system can be implemented to automatically detect the damaged or inoperable cable, and communicate an error state or diagnostic message to initiate a change in the networking path, such as to nearly instantaneously switch to an alternate data path.

In embodiments, the autonomous vehicle interface system implements data fusion, from which to determine what is actually around a vehicle in the surrounding environment. Given the multitude of data from all of the many system nodes, sensors, components, modules, and the like, the data is filtered to determine whether targets or objects around the vehicle are another vehicle, a pedestrian, a wall, a road, a stationary or moving object, road lanes, etc. Identifiers can be created for targets that are then tracked based on the different types of sensors and different types of data. The system can dynamically select which of the sensors has more input to what a tracked object may be, and can be based on weighted priorities and/or confidences in the sensors and systems that are used to make the determinations. For example, the LiDAR information can be treated as highly reliable if a target is ascertained as a recognizable object, particularly when combined with camera imaging data. Generally, the autonomous vehicle interface system can be implemented to receive multiple data streams (e.g., an arbitrary number of the data streams) and fuse them.

In implementations, there are many algorithms that can be developed on top of the system architecture to add value, such as for data fusion to determine objects and similarly for simultaneous localization and mapping (SLAM). The SLAM feature provides the ability to take data from an environmental spatial inputs, so say like a camera or a LiDAR or radar system, and to be able to move around in the environment and create a virtual map. By mapping the surrounding environment, and by virtue of creating the map, the system also localizes a vehicle within the environment.

The autonomous vehicle interface system also implements data logging, and can log both a recording of a current session (e.g., a vehicle drive) and diagnostic messages, so that if anything goes wrong, there will be a record, black box style. In implementations, the system logs just the low-level data (e.g., sensor data, node data), rather than all of the messages on the bus, which doesn't scale well and can be impractical due to the repeated messages after processing. Each individual system node does its own recording, such as a sensor node for a sensor records the sensor data generated at the sensor node. This feature provides that developers can later develop algorithms and run test scenarios with the actual logged node data for simulated real-World testing by adding that processing node to the bus and propagating that low-level data back up through the system to see what happens when the new node is on the real-time bus.

The autonomous vehicle interface system also implements a feature to configure different domains for different reliabilities. For example, a camera on a vehicle that is transmitting image data may have a logging node that is receiving the image data, deemed to be mission critical and set to be most reliable. Similarly, a viewer application may be receiving the same image data, and the viewer application is set to best effort on the reliable side, but may drop a couple of frames without causing concern. The quality of service is an important aspect of distributed systems in general because some data is critical and some is not, such as for control systems where the data may be critical. There are many system nodes, components, and modules of the system architecture that can be designated for quality of service.

The autonomous vehicle interface system also implements multi-domain systems and control. For example, the physical real-time bus is a domain of the system architecture, and if two domains (e.g., real-time buses) are implemented, communication data traffic can be virtually isolated. The two domains can be connected, as well as they can be isolated, or one domain may be encrypted while the other one is not. The feature of isolation can be important for the autonomous vehicle interface system when associated with control, such as to isolate the aspect of the vehicle that performs the control, so that the system can power it down unexpectedly in the event of a control error or something similar.

The autonomous vehicle interface system also implements the feature of streams. In a typical networking architecture, a node of a system has a piece of data and publishes it to the data bus, and subsequent pieces of data are also published to the data bus as the data becomes available. The streams feature allows a system node to receive sample data that comes in quickly and, rather than publishing each piece of data on the bus as it is received, the system node packs up a list or a package of mini samples and then puts them on the real-time bus together at once. For example, each frame of image data may not be published, and the system waits until thirty (30) frames have been received, or one second's worth of data, and then publishes the image data on the real-time bus all at once. The system architecture can also perform image decompression and compression on the delayed streams of data.

Figure 19:
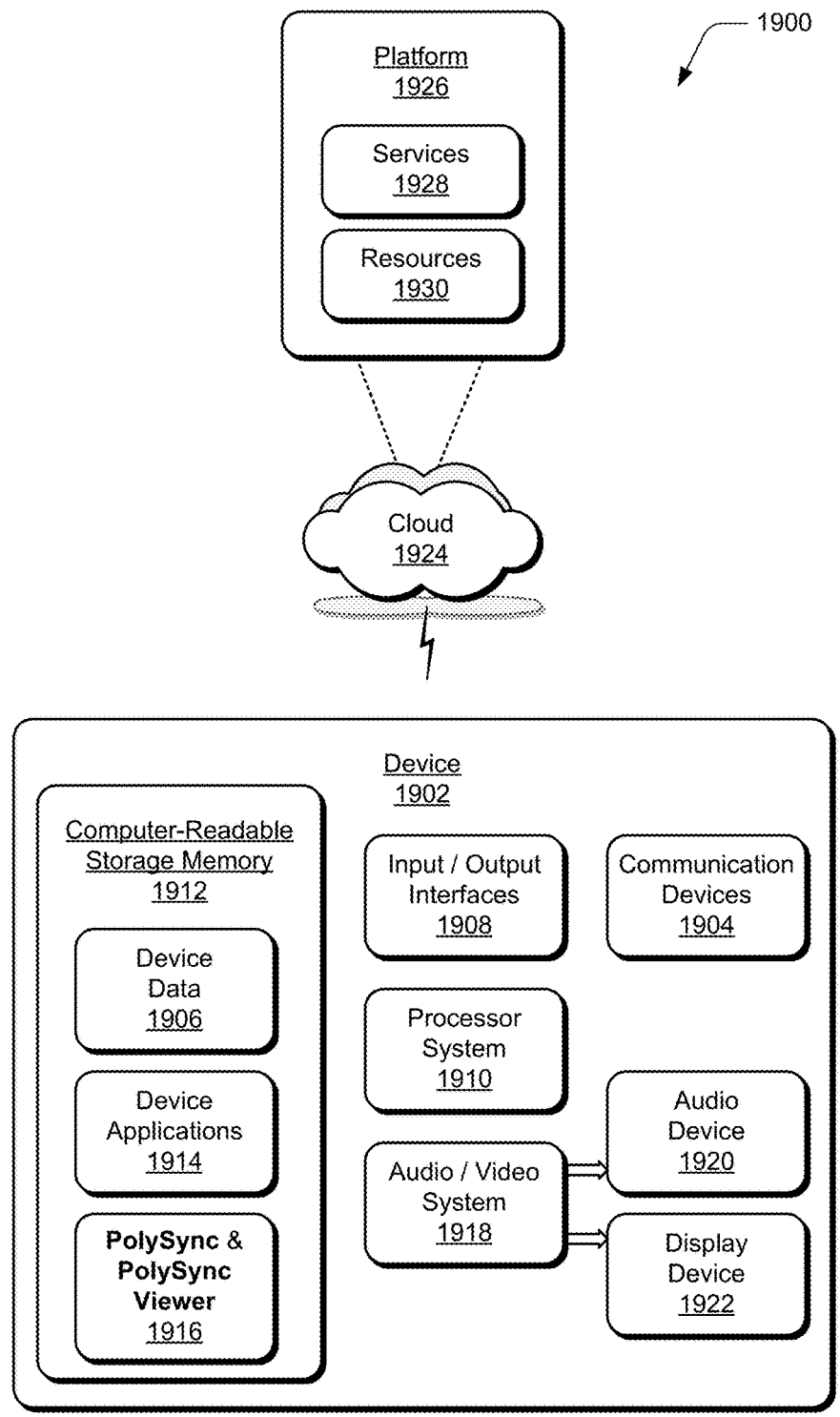
FIG. 19 illustrates an example system with an example device that can implement embodiments of an autonomous vehicle interface system.

FIG. 19 illustrates an example system 1900 that includes an example device 1902, which can implement embodiments of an autonomous vehicle interface system. The example device 1902 can be implemented as any devices and/or services (e.g., server devices) described with reference to the previous FIGS. 1-18, such as any type of sensor node in a distributed, autonomous vehicle system architecture. For example, each of the system nodes 1808 of the autonomous vehicle interface system 1804 shown in FIG. 18 may be implemented as the example device 1902.

The device 1902 includes communication devices 1904 that enable wired and/or wireless communication of device data 1906, such as device settings and data, sensor data, and any other type of system data stored on the device. The communication devices 1904 can also include transceivers for cellular phone communication and/or for network data communication.

The device 1902 also includes input/output (I/O) interfaces 1908, such as data network interfaces that provide connection and/or communication links between the device, data networks, and other devices. The I/O interfaces can be used to couple the device to any type of sensors, components, peripherals, and/or accessory devices, such as a touchscreen display surface that may be integrated with device 1902. The I/O interfaces also include data input ports via which any type of data, media content, and/or inputs can be received, such as user inputs to the device, as well as any type of audio, video, and/or image data received from any sensor, content, and/or data source.

The device 1902 includes a processor system 1908 of one or more processors (e.g., any of microprocessors, multi-core processors, controllers, and the like) and/or a processor and memory system (e.g., implemented in an SoC) that processes computer-executable instructions. The processor system can include a digital signal processing (DSP) subsystem for processing signals and data of the device. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternatively or in addition, the device 1902 can be implemented with any one or combination of software, hardware, firmware, or fixed logic circuitry that is implemented in connection with processing and control circuits, which are generally identified at 1910. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1902 also includes computer-readable storage memory 1912, such as data storage devices that can be accessed by a computing device, and that provide persistent storage of data and executable instructions (e.g., software applications, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 1912 provides storage of the device data 1906 and various device applications 1914, such as an operating system that is maintained as a software application with the computer-readable storage memory and executed by the processor system 1910. In this example, the device applications also include any of the PolySync and PolySync Viewer features 1916 that implement embodiments of an autonomous vehicle interface system, such as when the example device 1902 is implemented as a sensor node of the distributed architecture.

The device 1902 also includes an audio and/or video system 1918 that generates audio data for an audio device 1920 and/or generates display data for a display device 1922 (e.g., a touchscreen display surface). The audio device and/or the display device include any devices that process, display, and/or otherwise render audio, video, display, and/or image data, such as the image content of the PolySync Viewer features. In implementations, the audio device and/ or the display device are integrated components of the example device 1902. Alternatively, the audio device and/or the display device are external, peripheral components to the example device.

In embodiments, at least part of the techniques described for an autonomous vehicle interface system may be implemented in a distributed system, such as over a "cloud" 1924 in a platform 1926. The cloud 1924 includes and/or is representative of the platform 1926 for services 1928 and/or resources 1930. The platform 1926 abstracts underlying functionality of hardware, such as server devices (e.g., included in the services 1928) and/or software resources (e.g., included as the resources 1930), and connects the example device 1902 with other devices, servers, autonomous vehicle systems, etc.

The resources 1930 may include applications and/or data that can be utilized while computer processing is executed on servers that are remote from the example device 1902. Additionally, the services 1928 and/or the resources 1930 may facilitate subscriber network services, such as over the Internet, a cellular network, or Wi-Fi network. The platform 1926 may also serve to abstract and scale resources to service a demand for the resources 1930 that are implemented via the platform, such as in an interconnected device embodiment with functionality distributed throughout the system 1900. For example, the functionality may be implemented in part at the example device 1902 as well as via the platform 1926 that abstracts the functionality of the cloud 1924. In implementations, an individual autonomous vehicle system may include the device 1902, an implementation of the cloud 1924 for storage, and the platform 1926.

Although aspects of an autonomous vehicle interface system have been described in language specific to features and/or methods, the appended claims are not necessarily limited to the specific features or methods described. Rather, the specific features and methods are disclosed as example implementations of an autonomous vehicle interface system, and other equivalent features and methods are intended to be within the scope of the appended claims. Further, various different aspects are described and it is to be appreciated that each described aspect can be implemented independently or in connection with one or more other described aspects.

The invention claimed is:

1. An autonomous vehicle comprising:
a plurality of sensors configured to detect conditions in an environment of the autonomous vehicle and generate low-level sensor data indicative of the detected conditions;
an autonomous vehicle interface system comprising:
system nodes of the autonomous vehicle that are each a distributed node of the autonomous vehicle interface system, each of the system nodes having processing hardware and memory to independently process the low-level sensor data generated by one or more of the sensors or process high-level system data, the low-level sensor data abstracted to generate the high-level system data as a sensor data type of the respective one or more sensors, the abstracted sensor data type being invariant to specific sensor implementations; and
at least one on-vehicle real-time bus that connects the system nodes of the autonomous vehicle for data communications of the low-level sensor data and the high-level system data, each of the system nodes configured to publish the low-level sensor data or the high-level system data from a respective system node on the real-time bus, the published low-level sensor data and the high-level system data being exposed to each of the system nodes over the on-vehicle real-time bus for processing and vehicle control of the autonomous vehicle without an acting central managing computer managing the published low-level sensor data and the high-level system data that is exposed to the system nodes; and
one or more autonomous vehicle control systems configured to control operations of the autonomous vehicle within the environment based on the low-level sensor data and the high-level system data published on the real-time bus.

2. The autonomous vehicle as recited in claim 1, wherein:
the processing hardware of each of the system nodes is further configured to implement a node control module to:
detect a new system node implemented in the autonomous vehicle interface system; and
add the new system node as an independent, distributed node of the autonomous vehicle interface system.

3. The autonomous vehicle as recited in claim 2, wherein the new system node is a proprietary application of a vehicle manufacturer, and the new system node is connected to the on-vehicle real-time bus for access to the data communications of the low-level sensor data and the high-level system data.

4. The autonomous vehicle as recited in claim 1, wherein the autonomous vehicle interface system is configured according to an open source transport protocol that supports the data communications of the low-level sensor data and the high-level system data over the on-vehicle real-time bus.

5. The autonomous vehicle as recited in claim 1, wherein the system nodes of the autonomous vehicle are further configured to execute applications, each application is associated with at least one of a plurality of security levels, including at least one of:
a first security level that provides the applications in the first security level control over at least one vehicle actuator;
a second security level that provides the applications in the second security level chassis control access for path planning though the environment;
a third security level that provides the applications in the third security level control over at least one of an onboard sensing driver or a sensing application; or
a fourth security level that provides the applications in the fourth security level control over at least one of onboard entertainment or driver information for output via the autonomous vehicle.

6. The autonomous vehicle as recited in claim 1, wherein:
one or more of the plurality of sensors is configured to detect targets in the environment; and
the processing hardware of at least one of the system nodes is further configured to implement a node control module to:
receive the low-level sensor data from the one or more sensors;
abstract the received low-level sensor data to generate the high-level system data; and
publish the high-level system data via the on-vehicle real-time bus.

7. The autonomous vehicle as recited in claim 6, wherein the node control module is further configured to:
receive timestamps associated with the low-level sensor data from the respective sensors; and
correct all of the received timestamps to correlate with a synchronized system time for a unified time domain.

8. The autonomous vehicle as recited in claim 6, wherein the node control module is further configured to:
  detect a new sensor connected to the autonomous vehicle;
  determine a type and model of the new sensor based on a database of system supported sensors; and
  add the new sensor as a component of the autonomous vehicle.

9. The autonomous vehicle as recited in claim 1, wherein:
  one or more of the plurality of sensors is configured to detect targets in the environment; and
  the processing hardware of at least one of the system nodes is further configured to implement a node control module to:
  receive the high-level system data from one or more of the system nodes via the on-vehicle real-time bus, the high-level system data representative of the low-level sensor data in abstracted data form;
  determine by data fusion the targets in the environment surrounding the autonomous vehicle based on the high-level system data; and
  publish the determined targets via the on-vehicle real-time bus.

10. The autonomous vehicle as recited in claim 1, wherein:
  one or more of the plurality of sensors is configured to detect targets in the environment; and
  the processing hardware of at least one of the system nodes is further configured to implement a node control module to:
  receive the low-level sensor data from the one or more sensors; and
  log to maintain the received low-level sensor data.

11. The autonomous vehicle as recited in claim 1, wherein:
  one or more of the plurality of sensors is configured to detect targets in the environment;
  the memory of each of the system nodes is configured to maintain a complete copy of information enabling redistribution of the autonomous vehicle interface system across different said system nodes; and
  the processing hardware of each of the system nodes is further configured to implement a node control module to:
  detect a failure of the one or more sensors resulting in a loss of target detection by the failed sensor; and
  determine whether the sensors that remain operational can replace the loss of target detection by the failed sensor based on the complete copy of the autonomous vehicle interface system.

12. The autonomous vehicle as recited in claim 1, wherein:
  the memory of each of the system nodes is configured to maintain a complete copy of information enabling redistribution of the autonomous vehicle interface system across different said system nodes; and
  the processing hardware of each of the system nodes is further configured to implement a node control module to:
  detect a failure of one of the system nodes resulting in a loss of processing operations by the failed system node; and
  determine at least one of the system nodes that remains operational as a replacement system node for the failed system node, the replacement system node configured to perform the processing operations of the failed system node based on the complete copy of the autonomous vehicle interface system.

13. The autonomous vehicle as recited in claim 1, wherein the processing hardware of each of the system nodes is further configured to implement a node control module to:
  detect a communication failure of the data via a communication link of the on-vehicle real-time bus;
  determine a multi-path solution to re-route the data within the autonomous vehicle interface system; and
  said re-route the data via an alternate communication link of the on-vehicle real-time bus.

14. A method implemented by an autonomous vehicle, the method comprising:
  detecting conditions in an environment of the autonomous vehicle by a plurality of sensors of the autonomous vehicle;
  generating low-level sensor data by the plurality of sensors that is indicative of the detected conditions;
  abstracting the low-level sensor data to generate high-level system data, the low-level sensor data being abstracted to generate the high-level system data as a sensor data type by system nodes that are each a distributed node of an autonomous vehicle interface system of the autonomous vehicle, the abstracted sensor data type being invariant to specific sensor implementations;
  publishing the low-level sensor data and the high-level system data to an on-vehicle real time bus that connects the system nodes of the autonomous vehicle for data communications, the low-level sensor data and the high-level system data that is published by a respective system node over the on-vehicle real-time bus being exposed to the other system nodes for processing and vehicle control of the autonomous vehicle without an acting central managing computer managing the published low-level sensor data and the high-level system data that is exposed; and
  controlling operations of the autonomous vehicle within the environment based on the low-level sensor data and the high-level system data published to the on-vehicle real-time bus.

15. The method as recited in claim 14, further comprising:
  detecting a new system node implemented in the autonomous vehicle interface system; and
  adding the new system node as an independent, distributed node of the autonomous vehicle interface system.

16. The method as recited in claim 15, further comprising connecting a proprietary application of a vehicle manufacturer as the new system node to the on-vehicle real-time bus for exposure to the data communications of the low-level sensor data and the high-level system data.

17. The method as recited in claim 15, further comprising connecting a path planning algorithm as the new system node to the on-vehicle real-time bus for exposure to the data communications of the high-level system data to determine an autonomous vehicle path based on the high-level system data.

18. The method as recited in claim 14, further comprising:
  receiving timestamps associated with the low-level sensor data from the respective sensors; and
  correcting all of the received timestamps to correlate with a synchronized system time for a unified time domain.

19. The method as recited in claim 14, further comprising:
  receiving the high-level system data from one or more of the system nodes via the on-vehicle real-time bus, the high-level system data representative of the low-level sensor data in abstracted data form;

determining by data fusion targets in the environment surrounding the autonomous vehicle based on the high-level system data; and communicating the determined targets to all of the system nodes via the real time bus.

20. An autonomous vehicle interface system node that is onboard an autonomous vehicle having a plurality of sensors to detect conditions in an environment surrounding the autonomous vehicle, the autonomous vehicle interface system node comprising:

a memory and a processing system to implement a node control module to:

receive low-level sensor data from one or more of the sensors;

abstract the low-level sensor data to generate high-level system data, the low-level sensor data from a sensor being abstracted to generate the high-level system data as a sensor data type, the abstracted sensor data type being invariant to specific sensor implementations; and publish the low-level sensor data and the high-level system data over an on-vehicle real time bus of the autonomous vehicle by the system node, the on-vehicle real-time bus configured to expose data communications published by the system node to additional, distributed system nodes of the autonomous vehicle interface system without an acting central managing computer managing the published low-level sensor data and the high-level system data that is exposed, the operations of the autonomous vehicle controlled within the environment based, in part, on the low-level sensor data and the high-level system data published to the on-vehicle real-time bus.

21. The autonomous vehicle interface system node as recited in claim 20, wherein the node control module is further configured to independently process the low-level sensor received from the one or more sensors or process the high-level system data.

22. The autonomous vehicle interface system node as recited in claim 20, wherein the node control module is further configured to:

detect a new system node implemented in the autonomous vehicle interface system; and add the new system node as an independent, distributed node of the autonomous vehicle interface system.

23. The autonomous vehicle interface system node as recited in claim 22, wherein the new system node is a proprietary application for an automobile, and the new system node is connected to the on-vehicle real-time bus for access to the data communications of the low-level sensor data and the high-level system data.

24. The autonomous vehicle interface system node as recited in claim 20, wherein:

one or more of the plurality of sensors is configured to detect targets in the environment; and the node control module is further configured to:

determine by data fusion the targets in the environment surrounding the autonomous vehicle based on the high-level system data; and publish the determined targets via the on-vehicle real-time bus.

25. The autonomous vehicle interface system node as recited in claim 20, wherein:

one or more of the plurality of sensors is configured to detect targets in the environment;

the memory is further configured to maintain a complete copy of information enabling redistribution of the autonomous vehicle interface system across different system nodes; and the node control module is further configured to:

detect a failure of the one or more sensors resulting in a loss of target detection by the failed sensor; and determine whether the sensors that remain operational can replace the loss of target detection by the failed sensor based on the complete copy of the autonomous vehicle interface system.

* * * * *